US012750881B2

(12) United States Patent
Patil et al.

(10) Patent No.: US 12,750,881 B2
(45) Date of Patent: Sep. 29, 2026

(54) TECHNIQUES FOR MULTI-PRIMARY CHANNEL ACCESS

(71) Applicant: QUALCOMM Incorporated, San Diego, CA (US)

(72) Inventors: Abhishek Pramod Patil, San Diego, CA (US); Gaurang Naik, San Diego, CA (US); Yanjun Sun, San Diego, CA (US); Abdel Karim Ajami, San Diego, CA (US); George Cherian, San Diego, CA (US); Alfred Asterjadhi, San Diego, CA (US); Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 508 days.

(21) Appl. No.: 18/317,056

(22) Filed: May 12, 2023

(65) Prior Publication Data

US 2024/0381417 A1 Nov. 14, 2024

(51) Int. Cl.
*H04W 74/08* (2024.01)

(52) U.S. Cl.
CPC .................................. *H04W 74/08* (2013.01)

(58) Field of Classification Search
CPC ........... H04W 74/0816; H04W 74/006; H04W 74/002; H04W 74/08; H04W 84/12;
(Continued)

(56) References Cited

U.S. PATENT DOCUMENTS

2014/0269544 A1* 9/2014 Zhu ....................... H04L 1/1671 370/329
2015/0359008 A1 12/2015 Wang et al.
(Continued)

FOREIGN PATENT DOCUMENTS

WO WO-2022105983 A1 5/2022

OTHER PUBLICATIONS

International Search Report and Written Opinion—PCT/US2024/026880—ISA/EPO—Aug. 12, 2024.

*Primary Examiner* — Quoc Thai N Vu
(74) *Attorney, Agent, or Firm* — Holland & Hart LLP

(57) ABSTRACT

This disclosure provides methods, components, devices, and systems that support techniques for multi-primary channel access. Some aspects more specifically relate to providing assistance information to a first wireless device that supports multi-primary channel access. In some examples, the first wireless device may receive the assistance information from a second wireless device via a first channel. The assistance information may include a first indication to assist the first wireless device with accessing a second channel for the purpose of communicating with a third wireless device. In some implementations, the first indication may provide the first wireless device with timing information, bandwidth-related information, STA service information, synchronization information, transmit opportunity (TXOP) sharing information, or a combination thereof. The first wireless device may communicate with the third wireless device via the second channel based on accessing the second channel in accordance with the first indication from the second wireless device.

30 Claims, 19 Drawing Sheets

(58) Field of Classification Search
CPC ............. H04W 16/14; H04W 72/0446; H04W 72/27; H04W 88/08
See application file for complete search history.

(56) References Cited

U.S. PATENT DOCUMENTS

| | | | | |
|---|---|---|---|---|
| 2016/0345362 | A1* | 11/2016 | Lee | H04W 74/0816 |
| 2018/0098336 | A1 | 4/2018 | Alpert | |
| 2019/0306920 | A1* | 10/2019 | Son | H04W 74/004 |
| 2020/0245352 | A1 | 7/2020 | Seok et al. | |
| 2021/0410163 | A1* | 12/2021 | Xia | H04W 72/121 |
| 2022/0159718 | A1* | 5/2022 | Fang | H04W 74/0808 |
| 2023/0163808 | A1* | 5/2023 | Lou | H04W 74/002 455/101 |
| 2023/0232452 | A1* | 7/2023 | Li | H04W 74/002 370/329 |
| 2023/0388753 | A1* | 11/2023 | Wang | H04W 48/12 |
| 2024/0008080 | A1* | 1/2024 | Pettersson | H04W 72/02 |
| 2024/0306194 | A1* | 9/2024 | Ryu | H04W 74/08 |

* cited by examiner

TECHNIQUES FOR MULTI-PRIMARY CHANNEL ACCESS

TECHNICAL FIELD

This disclosure relates to wireless communication and, more specifically, to techniques for multi-primary channel access.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some WLANs, a wireless device (such as an AP or a STA) may contend for access to a wireless channel. If the wireless medium is occupied, the wireless device may switch to another wireless channel and refrain from using the occupied channel for a period of time. In some cases, however, the wireless device may be unable to determine when the occupied channel will become available again.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication at a first wireless device. The method may include receiving, from a second wireless device via a first channel, a first indication to assist the first wireless device in accessing a second channel for communication with at least one of a third wireless device. The method may further include communicating with the at least one of the third wireless device via the second channel based on accessing the second channel in accordance with the first indication from the second wireless device.

Another innovative aspect of the subject matter described in this disclosure can be implemented in an apparatus for wireless communication at a first wireless device. The apparatus may include at least one processor, at least one memory coupled with the at least one processor, and instructions stored in the at least one memory. The instructions may be executable by the at least one processor to cause the apparatus to receive, from a second wireless device via a first channel, a first indication to assist the first wireless device in accessing a second channel for communication with at least one of a third wireless device. The instructions may be further executable by the at least one processor to cause the apparatus to communicate with the at least one of the third wireless device via the second channel based on accessing the second channel in accordance with the first indication from the second wireless device.

Another innovative aspect of the subject matter described in this disclosure can be implemented in an apparatus for wireless communication at a first wireless device. The apparatus may include means for receiving, from a second wireless device via a first channel, a first indication to assist the first wireless device in accessing a second channel for communication with at least one of a third wireless device. The apparatus may further include means for communicating with the at least one of the third wireless device via the second channel based on accessing the second channel in accordance with the first indication from the second wireless device.

Another innovative aspect of the subject matter described in this disclosure can be implemented in a non-transitory computer-readable medium storing code for wireless communication at a first wireless device. The code may include instructions executable by at least one processor to receive, from a second wireless device via a first channel, a first indication to assist the first wireless device in accessing a second channel for communication with at least one of a third wireless device. The instructions may be further executable by the at least one processor to communicate with the at least one of the third wireless device via the second channel based on accessing the second channel in accordance with the first indication from the second wireless device.

In some implementations, the first wireless device may be a first access point (AP) or a first station (STA) that supports multi-primary channel access, enhanced multi-link single-radio (eMLSR) operation, or both, the second wireless device may be a second AP or a second STA associated with an overlapping basic service set (OBSS), one or both of the first wireless device or the second wireless device may be capable of operating non-concurrently on the first channel and the second channel, and the first indication from the second wireless device may be indicative of timing information that pertains to a network allocation vector (NAV) associated with a transmit opportunity (TXOP) on the first channel.

In some implementations, the first wireless device may be a first AP or a STA that supports multi-primary channel access, eMLSR operation, or both, the second wireless device may be a second AP associated with an OBSS, one or both of the first wireless device or the second wireless device may be capable of operating non-concurrently on the first channel and the second channel, and the first indication from the second wireless device includes bandwidth information that pertains to a restricted target wake time (R-TWT) service period of the second AP associated with the OBSS.

In some implementations, the first wireless device may be a STA that supports multi-primary channel access, eMLSR operation, or both, the second wireless device may be an AP that supports multi-primary channel access, eMLSR operation, or both, the at least one of the third wireless device includes the AP, the first channel may be the second channel, and the first indication from the second wireless device includes scheduling information that pertains to a set of STAs the AP intends to serve during a TXOP on the second channel.

In some implementations, the first wireless device may be an AP that supports multi-primary channel access, eMLSR operation, or both, the second wireless device may be a STA that supports multi-primary channel access, eMLSR operation, or both, the at least one of the third wireless device includes the STA, and the first indication from the second wireless device includes synchronization information to assist the AP in regaining synchronization on the first channel.

One innovative aspect of the subject matter described in this disclosure can be implemented in a method for wireless communication at a second wireless device. The method may include transmitting, via a first channel, a first indication to assist a first wireless device in accessing a second channel for communication with the second wireless device. The method may further include communicating with the first wireless device via the second channel based on assisting the first wireless device to access the second channel in accordance with the first indication from the second wireless device.

Another innovative aspect of the subject matter described in this disclosure can be implemented in an apparatus for wireless communication at a second wireless device. The apparatus may include at least one processor, at least one memory coupled with the at least one processor, and instructions stored in the at least one memory. The instructions may be executable by the at least one processor to cause the apparatus to transmit, via a first channel, a first indication to assist a first wireless device in accessing a second channel for communication with the second wireless device. The instructions may be further executable by the at least one processor to communicate with the first wireless device via the second channel based on assisting the first wireless device to access the second channel in accordance with the first indication from the second wireless device.

Another innovative aspect of the subject matter described in this disclosure can be implemented in an apparatus for wireless communication at a second wireless device. The apparatus may include means for transmitting, via a first channel, a first indication to assist a first wireless device in accessing a second channel for communication with the second wireless device. The apparatus may further include means for communicating with the first wireless device via the second channel based on assisting the first wireless device to access the second channel in accordance with the first indication from the second wireless device.

Another innovative aspect of the subject matter described in this disclosure can be implemented in a non-transitory computer-readable medium storing code for wireless communication at a second wireless device. The code may include instructions executable by at least one processor to transmit, via a first channel, a first indication to assist a first wireless device in accessing a second channel for communication with the second wireless device. The instructions may be further executable by the at least one processor to communicate with the first wireless device via the second channel based on assisting the first wireless device to access the second channel in accordance with the first indication from the second wireless device.

In some implementations, the first wireless device may be an AP that supports multi-primary channel access, eMLSR operation, or both, the second wireless device may be a STA that supports multi-primary channel access, eMLSR operation, or both, and the first indication from the second wireless device may transfer at least a portion of a TXOP on the second channel from the STA to the AP.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
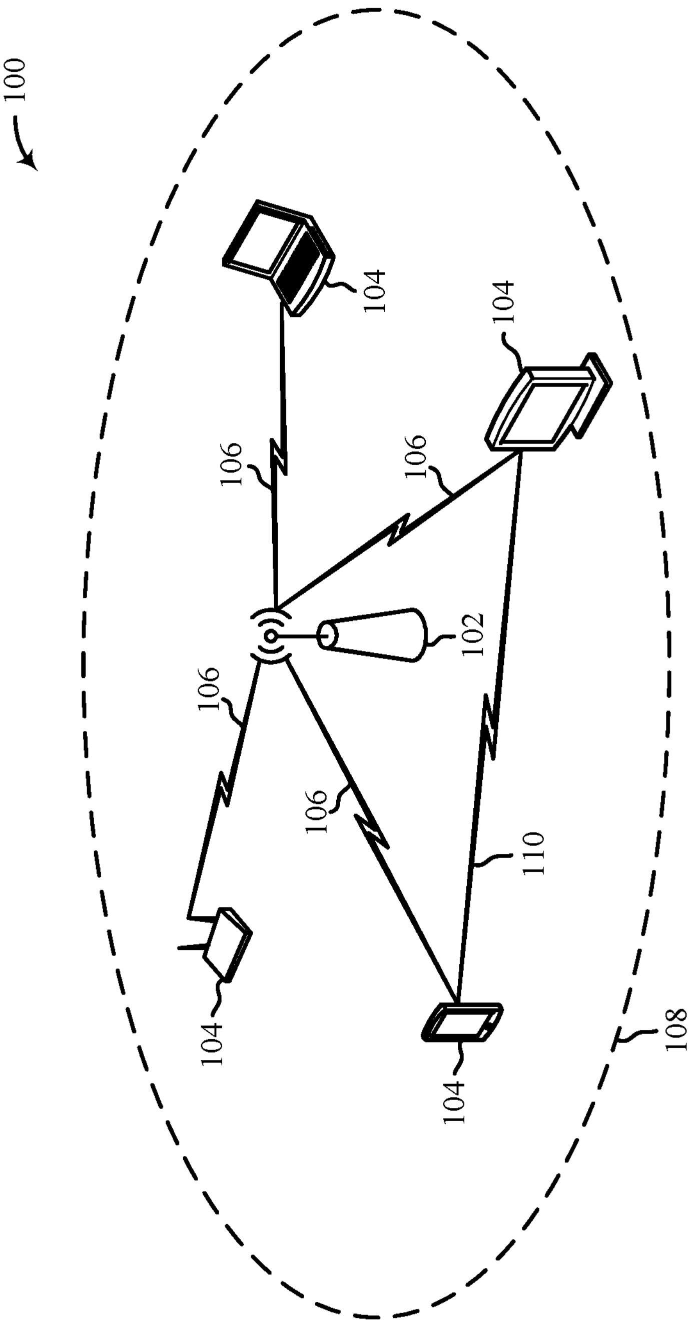
FIG. 1 shows a pictorial diagram of a wireless local area network (WLAN).

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others.

The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an Internet of Things (IoT) network.

In some wireless networks that support multi-primary channel access, wireless devices can use multiple channels or sub-channels to communicate with other wireless devices. For example, if a first wireless device performs a channel contention procedure and determines that a first channel is occupied by a second wireless device, the first wireless device may switch to a second channel until the first channel becomes available again. In some cases, after gaining access to the first channel, the second wireless device may advertise a network allocation vector (NAV) to let other wireless devices (such as the first wireless device) know how long the second wireless device intends to use the first channel.

The duration of time for which the second wireless device can use the first channel, known as a transmit opportunity (TXOP), may help the first wireless device determine when the first channel will become available again. In some cases, however, the second wireless device may extend or terminate the TXOP early. In such cases, if the first wireless device is configured with a single radio (and is thus unable to monitor two channels at once), or if the first wireless device loses synchronization on the first channel, the first wireless device may unnecessarily switch back to the first channel (resulting in higher processing overhead and/or power consumption) or remain on the second channel (resulting in higher resource overhead).

Various aspects relate generally to improving the efficiency of multi-primary channel access schemes. Some aspects more specifically relate to providing channel assistance information to a first wireless device, such as an access point (AP) or a station (STA) that supports multi-primary channel access and/or enhanced multi-link single-radio (cMLSR) operation. In some examples, the first wireless device may receive, from a second wireless device via a first channel, a first indication to assist the first wireless device in accessing a second channel (which may be the same or different from the first channel) for the purpose of communicating with at least a third wireless device (which may be the same or different from the second wireless device). The first wireless device may communicate with at least the third wireless device via the second channel based on accessing the second channel in accordance with the first indication from the second wireless device.

In some examples, the first channel and the second channel may be sub-channels within an operating bandwidth (such as in multi-primary channel access). In other examples, the first channel and the second channel may be different links (such as in enhanced multi-link single radio (eMLSR) AP systems). Although some aspects of the present disclosure are described in the context of multi-primary channel access, the concepts and techniques described herein also apply to eMLSR AP systems.

The first indication from the second wireless device may include timing information, bandwidth-related information, STA service information, synchronization information, TXOP sharing information, or a combination thereof. For example, the second wireless device may transmit an indication of whether a NAV advertised by the second wireless device accurately reflects the duration of an upcoming TXOP on the second channel, an indication of a bandwidth the second wireless device intends to use during an upcoming restricted target wake time (R-TWT) service period, a list of STAs the second wireless device intends to serve on the second channel, an indication that the first wireless device has lost synchronization on the first channel, or an indication that the second wireless device successfully gained access to the second channel, among other examples.

Particular aspects of the subject matter described in this disclosure can be implemented to realize one or more of the following potential advantages. In some examples, by providing the first wireless device with the aforementioned channel assistance information, the described techniques may enable the first wireless device to perform multi-primary channel access and/or eMLSR operations with greater signaling efficiency, reduced power consumption, and lower resource overhead. For example, if the assistance information indicates that the second wireless device does not intend to serve the first wireless device during an upcoming TXOP on the second channel, the first wireless device may switch channels or transition to a power saving mode and cease monitoring the first channel, thereby enabling the first wireless device to attain greater power savings.

For coordinated TDMA (C-TDMA), the first indication from the second wireless device may improve the performance of the first wireless device by enabling the first wireless device to utilize the second channel and attain higher throughput, reduced latency, etc. Without the first indication, the first wireless device may be unable to access the second channel, as the first wireless device may operate according to incorrect or unreliable NAV information.

For medium synchronization, without the assistance information provided by the second wireless device, the first wireless device may have to wait for a relatively long time before re-acquiring medium synchronization, or may be unaware that medium synchronization has been lost. The techniques described herein may reduce the delay associated with re-acquiring medium synchronization, thereby enabling the first wireless device to utilize the medium with reduced latency.

Furthermore, in cases where the first wireless device would have otherwise been unaware of medium synchronization loss, the described techniques may inform or notify the first device of the synchronization loss, thereby ensuring that the first wireless device can take measures to re-gain synchronization before accessing the medium. This not only improves the likelihood of successful transmissions from the first wireless device, but also ensures that transmissions from the first wireless device do not interfere or collide with ongoing transmissions from other wireless devices. As a result, the techniques described herein may improve the overall throughput, performance, and reliability of communications within the system.

For TXOP sharing, providing or otherwise transferring a TXOP to the first wireless device may reduce the delay associated with gaining access to the second channel, thereby enabling the first wireless device to transmit and receive packets with reduced latency.

FIG. 1 shows a pictorial diagram of a WLAN 100. According to some aspects, the WLAN 100 may be an example of Wi-Fi network. For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8).

The WLAN 100 may include numerous wireless communication devices such as a wireless AP 102 and multiple wireless STAs 104. While only one AP 102 is shown in FIG. 1, the WLAN 100 also can include multiple APs 102. AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR, etc.) can be further improved by a small cell which is supported by an AP 102 serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IoT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHZ, 5 GHZ, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHZ band, the 5 GHz band, the 60 GHz band, the 3.6 GHz band, and the 900 MHz band. Some examples of the APs 102 and STAs 104 described herein also may communicate in other frequency bands, such as the 5.9 GHZ and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4 GHZ, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHZ, 80 MHz. 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

According to some aspects of the present disclosure, a first wireless device (such as an AP 102 or a STA 104) may receive a first indication from a second wireless device (such as a STA 104 or an AP 102) via first channel. The first indication may assist the first wireless device with accessing a second channel (which may be the same or different from the first channel) for the purpose of communicating with a third wireless device (which may be the same or different from the second wireless device). The first wireless device may communicate with the third wireless device via the second channel based on accessing the second channel in accordance with the first indication from the second wireless device.

Figure 2:
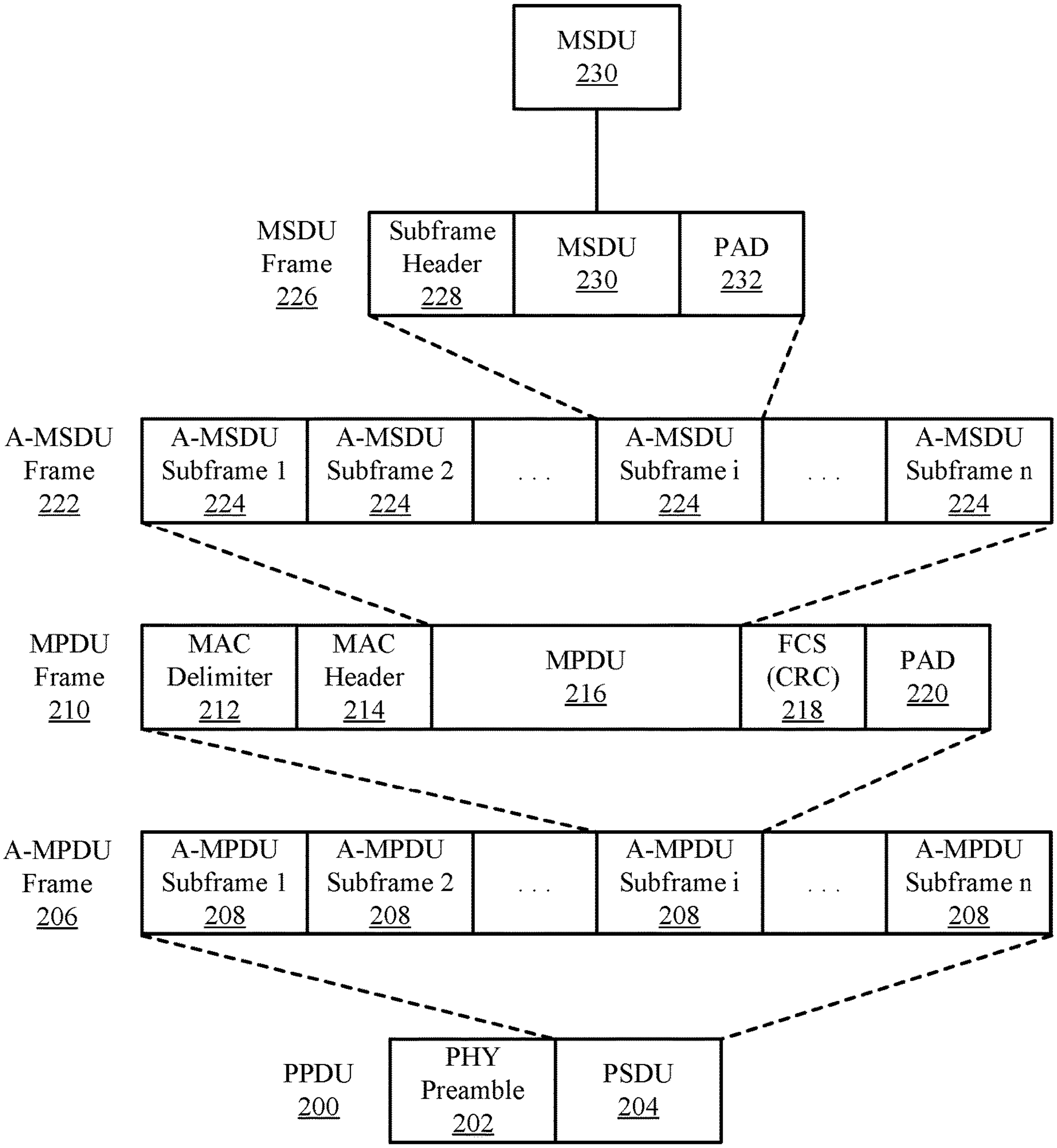
FIG. 2 shows a hierarchical format of an example physical layer protocol data unit (PPDU) usable for communications between a wireless AP and one or more wireless STAs.

FIG. 2 shows a hierarchical format of an example PPDU usable for communications between a wireless AP 102 and one or more wireless STAs 104. As described, each PPDU 200 includes a PHY preamble 202 and a PSDU 204. Each PSDU 204 may represent (or "carry") one or more MAC protocol data units (MPDUs) 216. For example, each PSDU 204 may carry an aggregated MPDU (A-MPDU) 206 that includes an aggregation of multiple A-MPDU subframes 208. Each A-MPDU subframe 206 may include an MPDU frame 210 that includes a MAC delimiter 212 and a MAC header 214 prior to the accompanying MPDU 216, which includes the data portion ("payload" or "frame body") of the MPDU frame 210. Each MPDU frame 210 also may include a frame check sequence (FCS) field 218 for error detection (for example, the FCS field may include a cyclic redundancy check (CRC)) and padding bits 220. The MPDU 216 may carry one or more MAC service data units (MSDUs) 230. For example, the MPDU 216 may carry an aggregated MSDU (A-MSDU) 222 including multiple A-MSDU subframes 224. Each A-MSDU subframe 224 contains an MSDU frame 226 with a corresponding MSDU 230 preceded by a subframe header 228 and in some cases followed by padding bits 232.

Referring back to the MPDU frame 210, the MAC delimiter 212 may serve as a marker of the start of the associated MPDU 216 and indicate the length of the associated MPDU 216. The MAC header 214 may include multiple fields containing information that defines or indicates characteristics or attributes of data encapsulated within the frame body. The MAC header 214 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its NAV. The MAC header 214 also includes one or more fields indicating addresses for the data encapsulated within the frame body. For example, the MAC header 214 may include a combination of a source address, a transmitter address, a receiver address or a destination address. The MAC header 214 may further include a frame control field containing control information. The frame control field may specify a frame type, for example, a data frame, a control frame, or a management frame.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it may wait for a particular time and then contend for access to the wireless medium. The DCF is implemented through the use of time intervals (including the slot time (or "slot interval") and the inter-frame space (IFS). IFS provides priority access for control frames used for proper network operation. Transmissions may begin at slot boundaries. Different varieties of IFS exist including the short IFS (SIFS), the distributed IFS (DIFS), the extended IFS (EIFS), and the arbitration IFS (AIFS). The values for the slot time and IFS may be provided by a suitable standard specification, such as one or more of the IEEE 802.11 family of wireless communication protocol standards.

In some examples, the wireless communication device may implement the DCF through the use of carrier sense multiple access (CSMA) with collision avoidance (CA) (CSMA/CA) techniques. According to such techniques, before transmitting data, the wireless communication device may perform a clear channel assessment (CCA) and may determine (for example, identify, detect, ascertain, calculate, or compute) that the relevant wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine (for example, identify, detect, ascertain, calculate, or compute) whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy.

Virtual carrier sensing is accomplished via the use of a NAV, which effectively serves as a time duration that elapses before the wireless communication device may contend for access even in the absence of a detected symbol or even if the detected energy is below the relevant threshold. The NAV is reset each time a valid frame is received that is not addressed to the wireless communication device. When the NAV reaches 0, the wireless communication device performs the physical carrier sensing. If the channel remains idle for the appropriate IFS, the wireless communication device initiates a backoff timer, which represents a duration of time that the device senses the medium to be idle before it is permitted to transmit. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has "won" contention for the wireless medium. The TXOP duration may be indicated in the U-SIG field of a PPDU. If, on the other hand, one or more of the carrier sense mechanisms indicate that the channel is busy, a MAC controller within the wireless communication device will not permit transmission.

Each time the wireless communication device generates a new PPDU for transmission in a new TXOP, it randomly selects a new backoff timer duration. The available distribution of the numbers that may be randomly selected for the backoff timer is referred to as the contention window (CW). There are different CW and TXOP durations for each of the four access categories (ACs): voice (AC_VO), video (AC_VI), background (AC_BK), and best effort (AC_BE). This enables particular types of traffic to be prioritized in the network.

Some APs 102 and STAs 104 may implement spatial reuse techniques. For example, APs 102 and STAs 104 configured for communications using IEEE 802.11ax or 802.11be may be configured with a BSS color. APs 102 associated with different BSSs may be associated with different BSS colors. A BSS color is a numerical identifier of an AP's respective BSS (such as a 6 bit field carried by the SIG field). Each STA 104 may learn its own BSS color upon association with the respective AP 102. BSS color information is communicated at both the PHY and MAC sublayers. If an AP 102 or a STA 104 detects, obtains, selects, or identifies, a wireless packet from another wireless communication device while contending for access, the AP 102 or STA 104 may apply different contention parameters in accordance with whether the wireless packet is transmitted by, or transmitted to, another wireless communication device within its BSS or from a wireless communication device from an overlapping BSS (OBSS), as determined, identified, ascertained, or calculated by a BSS color indication in a preamble of the wireless packet.

For example, if the BSS color associated with the wireless packet is the same as the BSS color of the AP 102 or STA 104, the AP 102 or STA 104 may use a first received signal strength indication (RSSI) detection threshold when performing a CCA on the wireless channel. However, if the BSS color associated with the wireless packet is different than the BSS color of the AP 102 or STA 104, the AP 102 or STA 104 may use a second RSSI detection threshold in lieu of using the first RSSI detection threshold when performing the CCA on the wireless channel, the second RSSI detection threshold being greater than the first RSSI detection threshold. In this way, the criteria for winning contention are relaxed when interfering transmissions are associated with an OBSS.

Some APs 102 and STAs 104 may implement techniques for spatial reuse that involve participation in a coordinated communication scheme. According to such techniques, an AP 102 may contend for access to a wireless medium to obtain control of the medium for a TXOP. The AP 102 that wins the contention (hereinafter also referred to as a "sharing AP") may select one or more other APs 102 (hereinafter also referred to as "shared APs") to share resources of the TXOP. The sharing and shared APs 102 may be located in proximity to one another such that at least some of their wireless coverage areas at least partially overlap. Some examples may specifically involve coordinated AP TDMA or OFDMA techniques for sharing the time or frequency resources of a TXOP. To share its time or frequency resources, the sharing AP 102 may partition the TXOP into multiple time segments or frequency segments each including respective time or frequency resources representing a portion of the TXOP. The sharing AP 102 may allocate the time or frequency segments to itself or to one or more of the shared APs 102. For example, each shared AP 102 may utilize a partial TXOP assigned by the sharing AP 102 for its uplink or downlink communications with its associated STAs 104.

In some examples of such TDMA techniques, each portion of a plurality of portions of the TXOP includes a set of time resources that do not overlap with any time resources of any other portion of the plurality of portions. In such examples, the scheduling information may include an indication of time resources, of multiple time resources of the TXOP, associated with each portion of the TXOP. For example, the scheduling information may include an indication of a time segment of the TXOP such as an indication of one or more slots or sets of symbol periods associated with each portion of the TXOP such as for multi-user TDMA.

In some other examples of OFDMA techniques, each portion of the plurality of portions of the TXOP includes a set of frequency resources that do not overlap with any frequency resources of any other portion of the plurality of portions. In such implementations, the scheduling information may include an indication of frequency resources, of multiple frequency resources of the TXOP, associated with each portion of the TXOP. For example, the scheduling information may include an indication of a bandwidth portion of the wireless channel such as an indication of one or more subchannels or resource units (RUs) associated with each portion of the TXOP such as for multi-user OFDMA.

In this manner, the sharing AP's acquisition of the TXOP enables communication between one or more additional shared APs 102 and their respective BSSs, subject to appropriate power control and link adaptation. For example, the sharing AP 102 may limit the transmit powers of the selected shared APs 102 such that interference from the selected APs 102 does not prevent STAs 104 associated with the TXOP owner from successfully decoding packets transmitted by the sharing AP 102. Such techniques may be used to reduce latency because the other APs 102 may not need to wait to win contention for a TXOP to be able to transmit and receive data according to conventional CSMA/CA or EDCA techniques.

Additionally, by enabling a group of APs 102 associated with different BSSs to participate in a coordinated AP transmission session, during which the group of APs 102 may share at least a portion of a single TXOP obtained by any one of the participating APs 102, such techniques may increase throughput across the BSSs associated with the participating APs 102 and may also achieve improvements in throughput fairness. Furthermore, with appropriate selection of the shared APs 102 and the scheduling of their respective time or frequency resources, medium utilization may be maximized or otherwise increased while packet loss resulting from OBSS interference is minimized or otherwise reduced. Various implementations may achieve these and other advantages without requiring that the sharing AP 102 or the shared APs 102 be aware of the STAs 104 associated with other BSSs, without requiring a preassigned or dedicated master AP 102 or preassigned groups of APs 102, and without requiring backhaul coordination between the APs 102 participating in the TXOP.

In some examples in which the signal strengths or levels of interference associated with the selected APs 102 are relatively low (such as less than a given value), or when the decoding error rates of the selected APs 102 are relatively low (such as less than a threshold), the start times of the communications among the different BSSs may be synchronous. Conversely, when the signal strengths or levels of interference associated with the selected APs 102 are relatively high (such as greater than the given value), or when the decoding error rates of the selected APs 102 are relatively high (such as greater than the threshold), the start times may be offset from one another by a time period associated with decoding the preamble of a wireless packet and determining, from the decoded preamble, whether the wireless packet is an intra-BSS packet or is an OBSS packet. For example, the time period between the transmission of an intra-BSS packet and the transmission of an OBSS packet may allow a respective AP 102 (or its associated STAs 104) to decode the preamble of the wireless packet and obtain the BSS color value carried in the wireless packet to determine whether the wireless packet is an intra-BSS packet or an OBSS packet. In this manner, each of the participating APs 102 and their associated STAs 104 may be able to receive and decode intra-BSS packets in the presence of OBSS interference.

In some examples, the sharing AP 102 may perform polling of a set of un-managed or non-co-managed APs 102 that support coordinated reuse to identify candidates for future spatial reuse opportunities. For example, the sharing AP 102 may transmit one or more spatial reuse poll frames as part of determining one or more spatial reuse criteria and selecting one or more other APs 102 to be shared APs 102. According to the polling, the sharing AP 102 may receive responses from one or more of the polled APs 102. In some specific examples, the sharing AP 102 may transmit a coordinated AP TXOP indication (CTI) frame to other APs 102 that indicates time and frequency of resources of the TXOP that can be shared. The sharing AP 102 may select one or more candidate APs 102 upon receiving a coordinated AP TXOP request (CTR) frame from a respective candidate AP 102 that indicates a desire by the respective AP 102 to participate in the TXOP.

The poll responses or CTR frames may include a power indication, for example, an RX power or RSSI measured by the respective AP 102. In some other examples, the sharing AP 102 may directly measure potential interference of a service supported (such as uplink transmission) at one or more APs 102, and select the shared APs 102 based on the measured potential interference. The sharing AP 102 generally selects the APs 102 to participate in coordinated spatial reuse such that it still protects its own transmissions (which may be referred to as primary transmissions) to and from the STAs 104 in its BSS. The selected APs 102 may then be allocated resources during the TXOP as described above.

Some wireless communication devices (including both APs 102 and STAs 104) are capable of multi-link operation (MLO). In some examples, MLO supports establishing multiple different communication links (such as a first link on the 2.4 GHZ band, a second link on the 5 GHz band, and the third link on the 6 GHz band) between the STA 104 and the AP 102. Each communication link may support one or more sets of channels or logical entities. In some cases, each communication link associated with a given wireless communication device may be associated with a respective radio of the wireless communication device, which may include one or more transmit/receive (Tx/Rx) chains, include or be coupled with one or more physical antennas, or include signal processing components, among other components. An MLO-capable device may be referred to as a multi-link device (MLD). For example, an AP MLD may include multiple APs 102 each configured to communicate on a respective communication link with a respective one of multiple STAs 104 of a non-AP MLD (also referred to as a "STA MLD"). The STA MLD may communicate with the AP MLD over one or more of the multiple communication links at a given time.

One type of MLO is multi-link aggregation (MLA), where traffic associated with a single STA 104 is simultaneously transmitted across multiple communication links in parallel to maximize the utilization of available resources to achieve higher throughput. That is, during at least some duration of time, transmissions or portions of transmissions may occur over two or more links in parallel at the same time. In some examples, the parallel wireless communication links may support synchronized transmissions. In some other examples, or during some other durations of time, transmissions over the links may be parallel, but not be synchronized or concurrent. In some examples or durations of time, two or more of the links may be used for communications between the wireless communication devices in the same direction (such as all uplink or all downlink). In some other examples or durations of time, two or more of the links may be used for communications in different directions. For example, one or more links may support uplink communications and one or more links may support downlink communications. In such examples, at least one of the wireless communication devices operates in a full duplex mode. Generally, full duplex operation enables bi-directional communications where at least one of the wireless communication devices may transmit and receive at the same time.

MLA may be implemented in a number of ways. In some examples, MLA may be packet-based. For packet-based aggregation, frames of a single traffic flow (such as all traffic associated with a given traffic identifier (TID)) may be sent concurrently across multiple communication links. In some other examples, MLA may be flow-based. For flow-based aggregation, each traffic flow (such as all traffic associated with a given TID) may be sent using a single one of multiple available communication links. As an example, a single STA MLD may access a web browser while streaming a video in parallel. The traffic associated with the web browser access may be communicated over a first communication link while the traffic associated with the video stream may be communicated over a second communication link in parallel (such that at least some of the data may be transmitted on the first channel concurrently with data transmitted on the second channel).

In some other examples, MLA may be implemented as a hybrid of flow-based and packet-based aggregation. For example, an MLD may employ flow-based aggregation in situations in which multiple traffic flows are created and may employ packet-based aggregation in other situations. The determination to switch among the MLA techniques or modes may additionally, or alternatively, be associated with other metrics (such as a time of day, traffic load within the network, or battery power for a wireless communication device, among other factors or considerations).

To support MLO techniques, an AP MLD and a STA MLD may exchange supported MLO capability information (such as supported aggregation type or supported frequency bands, among other information). In some examples, the exchange of information may occur via a beacon signal, a probe request or probe response, an association request or an association response frame, a dedicated action frame, or an operating mode indicator (OMI), among other examples. In some examples, an AP MLD may designate a given channel in a given band as an anchor channel (such as the channel on which it transmits beacons and other management frames). In such examples, the AP MLD also may transmit beacons (such as ones which may contain less information) on other channels for discovery purposes.

MLO techniques may provide multiple benefits to a WLAN. For example, MLO may improve user perceived throughput (UPT) (such as by quickly flushing per-user transmit queues). Similarly, MLO may improve throughput by improving utilization of available channels and may increase spectral utilization (such as increasing the bandwidth-time product). Further, MLO may enable smooth transitions between multi-band radios (such as where each radio may be associated with a given RF band) or enable a framework to set up separation of control channels and data channels. Other benefits of MLO include reducing the ON time of a modem, which may benefit a wireless communication device in terms of power consumption. Another benefit of MLO is the increased multiplexing opportunities in the case of a single BSS. For example, multi-link aggregation may increase the number of users per multiplexed transmission served by the multi-link AP MLD.

According to some aspects of the present disclosure, a first wireless device (such as an AP 102 or a STA 104) may receive a first indication from a second wireless device (such as a STA 104 or an AP 102) via first channel. The first indication may assist the first wireless device with accessing a second channel (which may be the same or different from the first channel) for the purpose of communicating with at least a third wireless device (which may be the same or different from the second wireless device). The first wireless device may communicate with at least the third wireless device via the second channel based on accessing the second channel in accordance with the first indication from the second wireless device. In some implementations, the first wireless device may communicate with other wireless devices (in addition to the third wireless device) via the second channel.

Figure 3:
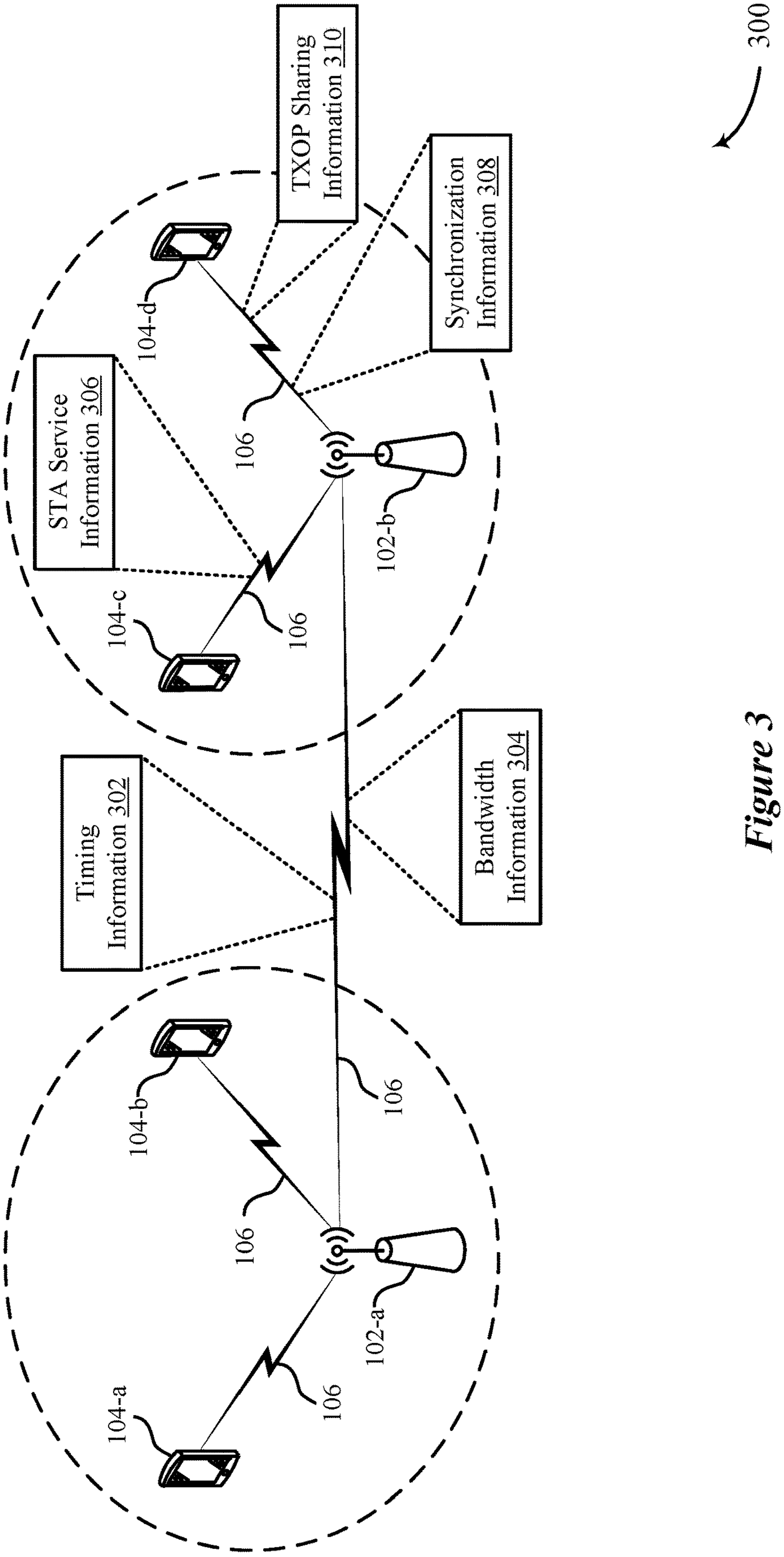
FIG. 3 shows an example of a signaling diagram that supports techniques for multi-primary channel access according to some aspects of the present disclosure.

FIG. 3 shows an example of a signaling diagram 300 that supports techniques for multi-primary channel access according to some aspects of the present disclosure. The signaling diagram 300 may implement or be implemented by aspects of the WLAN 100, as shown and described with reference to FIG. 1. For example, the signaling diagram 300 includes an AP 102-*a* and an AP 102-*b*, which may be examples of corresponding devices described herein, such as the AP 102 described with reference to FIG. 1. The signaling diagram 300 also includes a STA 104-*a*, a STA 104-*b*, a STA 104-*c*, and a STA 104-*d*, which may be examples of corresponding devices described herein, such as the STAs 104 described with reference to FIG. 1.

In some wireless networks that support multi-primary channel access, wireless devices can use multiple channels or sub-channels, such as a main primary (M-Primary) channel or an opportunistic primary (O-Primary) channel, to communicate with other wireless devices. As described herein, multi-primary channel access may also be referred to as non-primary channel access or secondary channel access. As described herein, an M-Primary channel may also be referred to as a primary sub-channel or a first primary channel, and an O-Primary channel may be referred to as a non-primary sub-channel or a second primary channel. Some wireless devices that support multi-primary channel access may be configured to contend for access to a given channel. For example, the AP 102-*b* may contend for access to a first channel (such as an M-Primary channel) by monitoring an energy level of the first channel or by detecting an 802.11 signal preamble. If the AP 102-*b* determines that the first channel is occupied by the AP 102-*a*, the AP 102-*b* may switch to a second channel until the first channel becomes available again. In some cases, after gaining access to the first channel, the AP 102-*a* may advertise a NAV to let other wireless devices (such as the AP 102-*b*) know how long the AP 102-*a* intends to use the first channel.

The duration of time for which the AP 102-*a* can use the first channel, known as a TXOP, may help the AP 102-*b* determine when the first channel will become available again. In some cases, however, the AP 102-*a* may extend the TXOP (for example, by sharing the TXOP with one or both of the STA 104-*a* or the STA 104-*b*) or terminate the TXOP early (for example, by transmitting a contention free end (CF-E) frame). In such cases, if the AP 102-*b* is configured with a single radio (and is thus unable to monitor two channels at once), or if the AP 102-*b* loses synchronization on the first channel, the AP 102-*b* may unnecessarily switch back to the first channel (resulting in higher processing overhead and/or power consumption) or remain on the second channel (resulting in higher resource overhead).

Various aspects of the signaling diagram 300 relate generally to improving the efficiency of multi-primary channel access schemes. Some aspects more specifically relate to providing channel assistance information to a first wireless device (such as the AP 102-*b*) that supports multi-primary channel access and/or eMLSR operation. In some examples, the first wireless device may receive, from a second wireless device (such as the AP 102-*a* or the STA 104-*d*) via a first channel, a first indication to assist the first wireless device in accessing a second channel (such as an M-Primary channel or an O-Primary channel) for the purpose of communicating with a third wireless device (such as the STA 104-*d*). The first wireless device may communicate with at least the third wireless device via the second channel based on accessing the second channel in accordance with the first indication from the second wireless device.

The first indication from the second wireless device may include timing information 302, bandwidth-related information 304, STA service information 306, synchronization information 308, TXOP sharing information 310, or a combination thereof. The timing information 302 may indicate, for example, whether a NAV advertised by the second wireless device (i.e., the AP 102-*a*) corresponds to the actual duration of a TXOP reserved by the second wireless device. The bandwidth-related information 304 may indicate a bandwidth of the second wireless device (i.e., the AP 102-*a*) intends to use during an upcoming R-TWT service period. The STA service information 306 may indicate a list of STAs 104 the second wireless device (i.e., the AP 102-*b*) intends to serve on the second channel. The synchronization information 308 may indicate that the first wireless device (i.e., the AP 102-*b*) has lost synchronization on the first channel. The TXOP sharing information 310 may indicate that the second wireless device (i.e., the STA 104-*d*) successfully gained access to the second channel and is transferring some or all of the TXOP to the first device, among other examples.

Particular aspects of the subject matter shown and described with reference to FIG. 3 can be implemented to realize one or more of the following potential advantages. In some examples, by providing the first wireless device (such as the STA 104-*c*) with the aforementioned channel assistance information, the described techniques may enable the first wireless device to perform multi-primary channel access and/or eMLSR operations with greater signaling efficiency, reduced power consumption, and lower resource overhead. For example, if the STA service information 306 indicates that the AP 102-*b* does not intend to serve the STA 104-*c* during an upcoming TXOP on the second channel, the STA 104-*c* may switch channels or transition to a power saving mode and cease monitoring the first channel, thereby enabling the STA 104-*c* to attain greater power savings.

For C-TDMA (as shown and described with reference to FIGS. 7A through 7D), the first indication from the second wireless device may improve the performance of the first wireless device by enabling the first wireless device to utilize the second channel and attain higher throughput, reduced latency, etc. Without the first indication, the first wireless device may be unable to access the second channel, as the first wireless device may operate according to incorrect or unreliable NAV information.

For medium synchronization (as shown and described with reference to FIGS. 10A through 10C), without the assistance information provided by the second wireless device, the first wireless device may have to wait for a relatively long time before re-acquiring medium synchronization, or may be unaware that medium synchronization has been lost. The techniques described herein may reduce the delay associated with re-acquiring medium synchronization, thereby enabling the first wireless device to utilize the medium with reduced latency.

Furthermore, in cases where the first wireless device would have otherwise been unaware of medium synchronization loss, the described techniques may inform or notify the first device of the synchronization loss, thereby ensuring that the first wireless device can take measures to re-gain synchronization before accessing the medium. This not only improves the likelihood of successful transmissions from the first wireless device, but also ensures that transmissions from the first wireless device do not interfere or collide with ongoing transmissions from other wireless devices. As a result, the techniques described herein may improve the overall throughput, performance, and reliability of communications within the system.

For TXOP sharing (as shown and described with reference to FIG. 11), providing or otherwise transferring a TXOP to the first wireless device may reduce the delay associated with gaining access to the second channel, thereby enabling the first wireless device to transmit and receive packets with reduced latency.

Figure 4A:
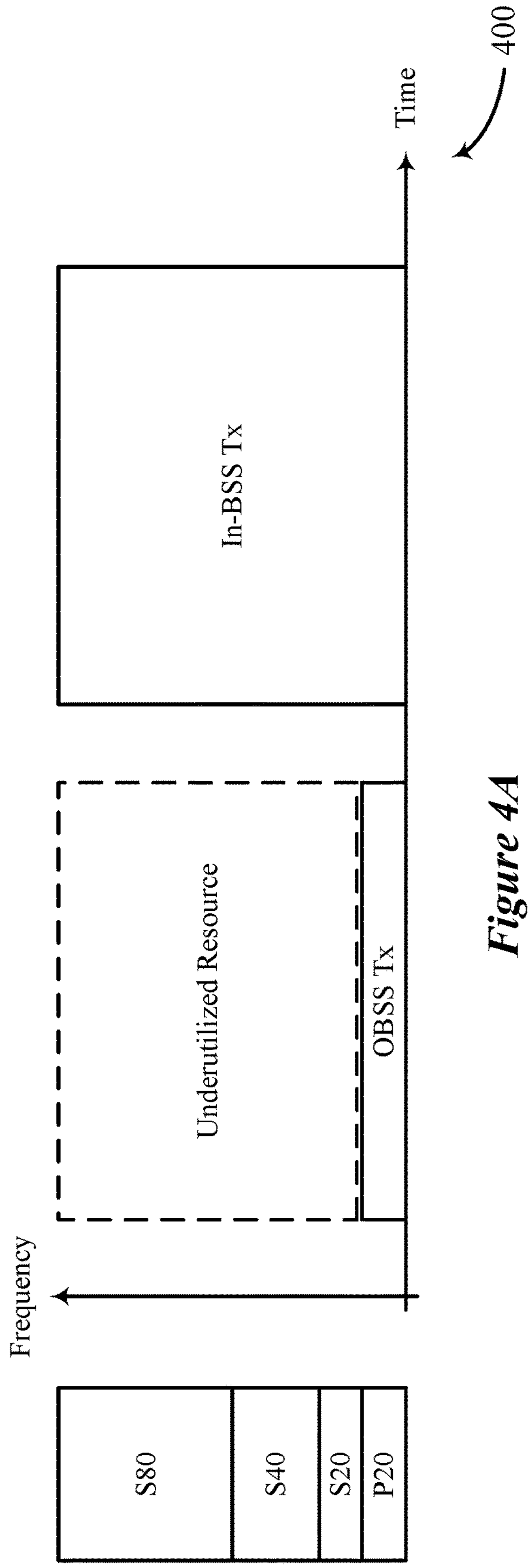
FIGS. 4A and 4B show examples of resource diagrams that support techniques for multi-primary channel access according to some aspects of the present disclosure.
Figure 4B:
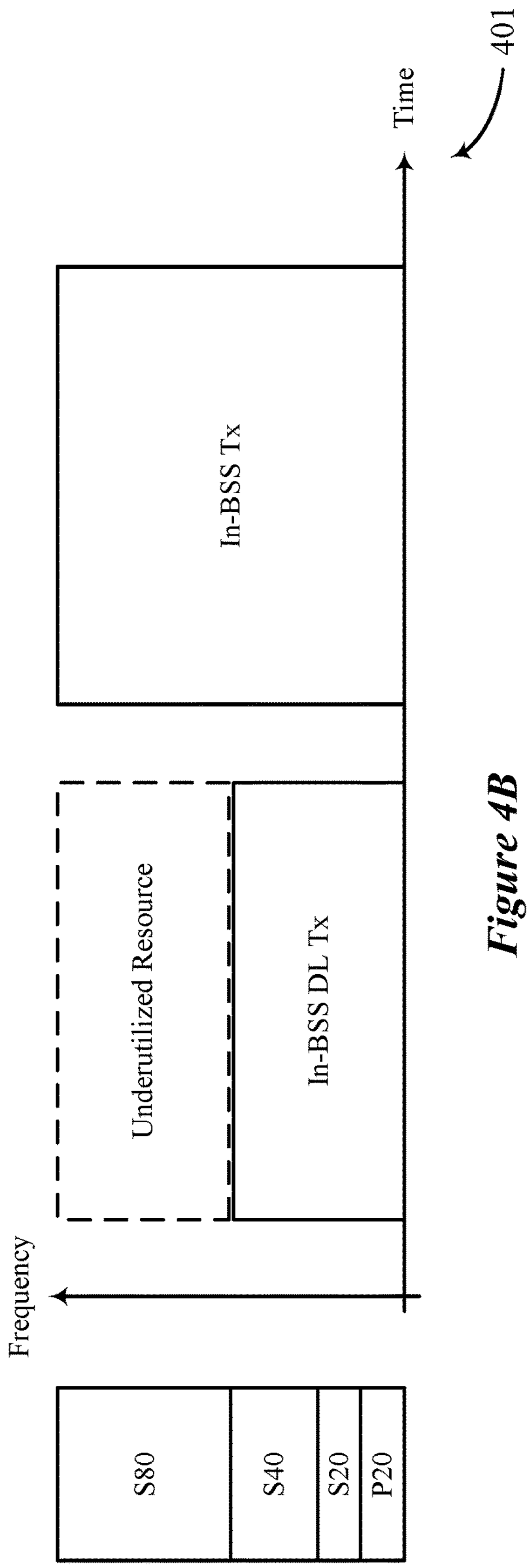

FIGS. 4A and 4B show examples of a resource diagram 400 and a resource diagram 401, respectively, that support techniques for multi-primary channel access according to some aspects of the present disclosure. The resource diagrams 400 and 401 may implement or be implemented by aspects of the WLAN 100 or the signaling diagram 300, as shown and described with reference to FIGS. 1 and 3. For example, some aspects of the resource diagrams 400 and 401 may be implemented by a wireless STA (such as one of the STAs 104 described with reference to FIG. 1), and other aspects of the resource diagrams 400 and 401 may be implemented by a wireless AP (such the AP 102 described with reference to FIG. 1).

As described herein, some wireless networks (such as the WLAN 100) may support multi-primary channel access. A device that supports ultra-high reliability (UHR) communications may be capable of monitoring additional 20 MHz channel(s) within an operating bandwidth. Monitoring may be sequential or parallel. As described herein, a primary channel may be referred to as an M-Primary channel. Additional subchannel(s) may be referred to as O-Primary channels. M-Primary functions as a primary channel, and may be used for beaconing, serving legacy clients, etc. O-Primary enables opportunistic access on under-utilized subchannels. In some implementations, wireless devices may be unable to use M-Primary and O-Primary for simultaneous transmission and reception. In some other implementations, frequency separation can be used to support simultaneous Rx/Rx (for example, using multiple receive chains).

As described herein, some wireless networks (such as the WLAN 100) may support eMLSR APs. A wireless device that supports UHR communications may be capable of monitoring multiple links that are configured for an associated AP. The monitoring may be sequential or parallel. As described herein, one of the channels may be a channel associated with a primary link of the AP. Additional channel(s) may be associated with non-primary links (or secondary links) of the APs. A primary link (also referred to herein as an M-Primary link) may be used for beaconing, serving legacy clients, etc. A non-primary link (also referred to herein as an O-Primary link) enables opportunistic access on under-utilized sub-channels/links. In some implementations, wireless devices may be unable to use primary and non-primary link(s) for simultaneous transmission and reception. In some other implementations, frequency separation can be used to support simultaneous Rx/Rx (for example, using multiple receive chains). Although the concepts described hereinafter are explained in the context of multi-primary channel access, the described techniques are also applicable to eMLSR AP systems.

In some implementations, multi-primary access is enabled by an additional radio. In other implementations, however, these features can be enabled without an additional radio. If an additional radio is available, the use of such is not precluded. Thus, multi-primary features can be used for UHR with or without an additional radio. Some of the implementations described herein may assume there is no additional radio at the UHR device. To support multi-primary channel access without an additional radio, the transmitter and receiver may sequentially scan primary channels in the following manner: start with M-Primary; move to O-Primary-1 if M-Primary is busy; move to O-Primary-2 if O-Primary-1 is busy; and so on.

If there is an M-Primary and one O-Primary, the transmitter may perform CCA on M-Primary. If an OBSS PPDU is detected on M-Primary, the transmitter may record the NAV and switch to O-Primary. Accordingly, the transmitter may perform CCA on O-Primary. When random back-off (RBO) counts down, the transmitter may initiate frame exchanges with an Initial Control frame (ICF), which could be a multi-user request to send (MU-RTS), a buffer status report poll (BSRP) or some other frame, such as a bandwidth query report poll (BQRP) frame. On the other hand, the receiver may wait for a PPDU on M-Primary. If a OBSS PPDU is detected on M-Primary, the receiver may record the NAV and switch to O-Primary. Accordingly, the receiver may wait for a PPDU on O-Primary until M-Primary NAV is 0. Thereafter, the receiver may return to M-Primary before the NAV expires. If there is more than one O-Primary, the AP may specify the hopping order/sequence. The transmitter and receiver may switch to the next O-Primary in the sequence if the current primary is busy.

In some cases, a STA or an AP may lose synchronization (i.e., "go blind") on a particular channel. When a STA is blind for more than 72 microseconds, the STA may initialize a medium synchronization delay timer (MSDTimer) to a non-zero value. While the MSDTimer is not zero, if the STA intends to initiate a TXOP, the STA may use an energy detection threshold (dot11MSDOFDMEDthreshold) to perform energy detection. The STA may use a request to send (RTS) and clear to send (CTS) frame exchange to initiate a TXOP. The STA may be precluded from initiating more than a threshold quantity (dot11MSDTXOPMAX) of TXOPs. The STA may use the following default medium synchronization delay (MSD) parameters: MSDTimer=aPPDUMaxTime; dot11MSDOFDMEDthreshold=−72 dBm; dot11MSDTXOPMAX=1. An AP can override these parameters by including the Medium Synchronization Delay Information sub-field in (Re) association Response frames that the AP transmits (e.g., the (Re) Association Response frames or Beacon and Probe Response frames).

Access to wideband channels in 802.11 is contingent on access to the primary channel (P20). This can sometimes lead to underutilization of the available bandwidth if, for example, a narrowband OBSS transmission occupies the primary channel (as depicted in the example of FIG. 4A) or if an AP transmits downlink PPDUs to a narrowband STA (as depicted in the example of FIG. 4B). Harvesting this under-utilized medium can help improve latency and throughput.

Figure 5:
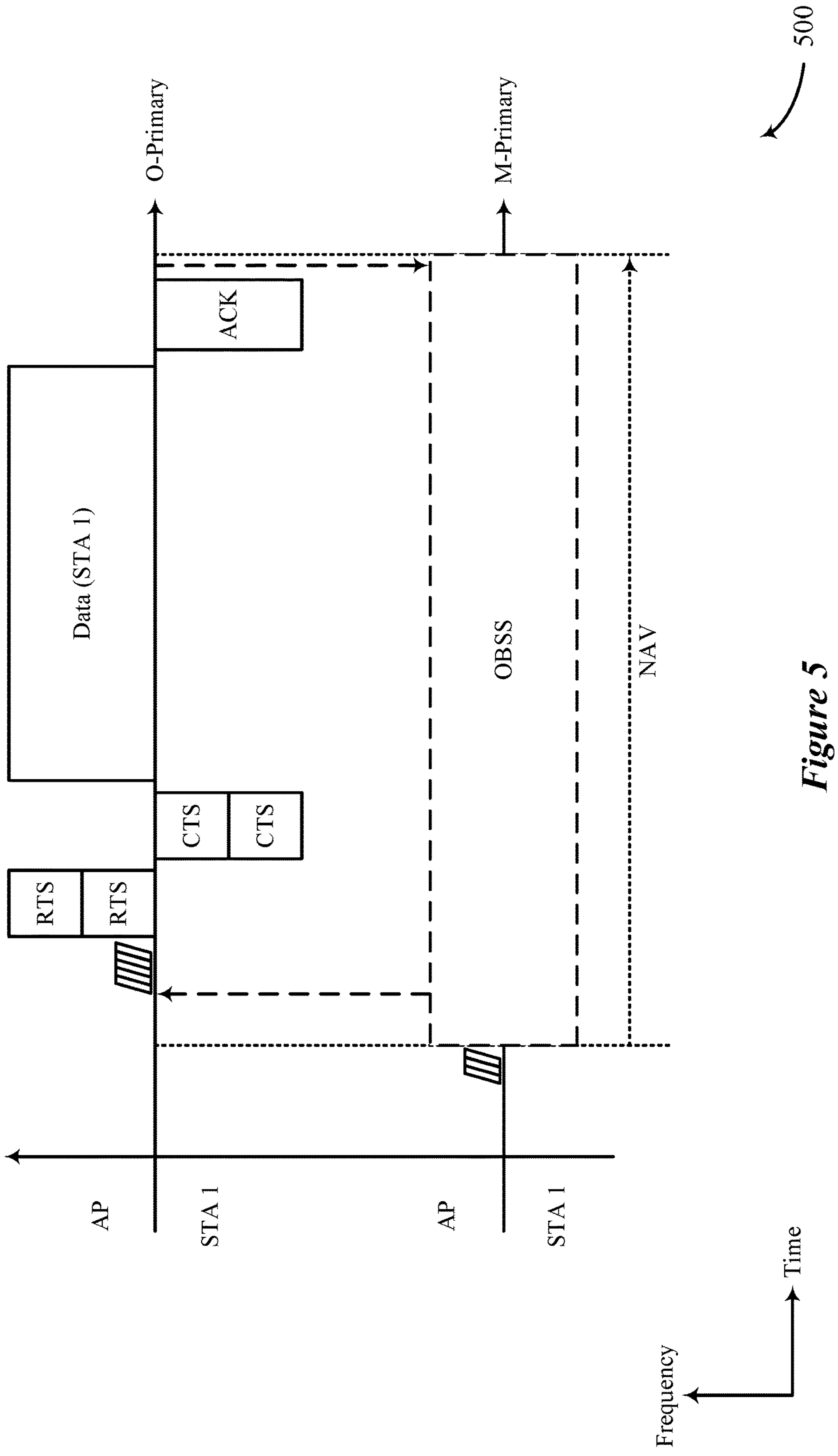
FIG. 5 shows an example of a resource diagram that supports techniques for multi-primary channel access according to some aspects of the present disclosure.

FIG. 5 shows an example of a resource diagram 500 that supports techniques for multi-primary channel access according to some aspects of the present disclosure. The resource diagram 500 may implement or be implemented by aspects of the WLAN 100 or the signaling diagram 300, as shown and described with reference to FIGS. 1 and 3. For example, some aspects of the resource diagram 500 may be implemented by a wireless AP (referred to hereinafter as the AP), such as the AP 102-*b* shown and described with reference to FIG. 3. Other aspects of the resource diagram 500 may be implemented by a wireless STA (referred to hereinafter as STA 1), such as the STA 104-*d* shown and described with reference to FIG. 3.

In the example of FIG. 5, the AP may contend on M-Primary. The AP may decode a PPDU and determine that the PPDU is associated with an OBSS. The AP and STA 1 may both detect the OBSS PPDU on M-Primary and switch their main radios to O-Primary. Accordingly, the AP may begin contention on O-Primary. The AP may send an RTS frame (or a similar frame that solicits an immediate response from STA 1) to confirm that STA 1 has also switched to O-Primary. In response to the RTS frame, STA 1 may transmit a CTS frame (or a similar frame depending on the soliciting frame sent by the AP) to confirm that STA 1 has switched to O-Primary. Thereafter, the AP and STA 1 may exchange one or more frames (e.g., data frames corresponding to applications). AP and STA 1 may switch back to M-Primary before the NAV indicated by the OBSS PPDU expires. If, for example, the AP is configured with an additional radio (e.g., AUX), the AP may contend on M-Primary and O-Primary in parallel, which can reduce the latency associated with accessing O-Primary.

The techniques described herein, including with reference to FIG. 5, support several enhancements to multi-primary operations. Such techniques generally pertain to NAV-related assistance information, coordinated R-TWT (C-R-TWT) information, STA service information, synchronization recovery information, and TXOP sharing information.

The NAV-related assistance information may indicate a shortened NAV. Some features in UHR, such as coordinated TDMA (C-TDMA), involve a frame exchange where the actual NAV is not indicated by the frames. Since Multi-Primary channel access relies on the actual (i.e., true) NAV of OBSS transmissions to determine the O-Primary TXOP, the NAV-related assistance information may enable Multi-Primary transmissions when OBSS STAs use UHR features (such as C-TDMA).

The C-R-TWT information may indicate opportunities during a C-R-TWT service period. The C-R-TWT feature in UHR involves coordination among a friendly (or coordinating) set of APs. APs in this set may have information regarding bandwidth utilization within the R-TWT service periods. Signaling the bandwidth utilization of the friendly APs can enable or otherwise provide additional TXOPs on O-Primary.

The STA service information may indicate the intention (or absence thereof) of an AP to serve a group of STAs on O-Primary. Non-AP STAs that switch to O-Primary may be unaware of whether the AP intends to serve them during an O-Primary TXOP. Announcing the intention to serve the STA on O-Primary can enable STAs to save power during multi-primary operation.

The synchronization recovery information may assist an AP with medium synchronization recovery (e.g., on M-Primary). For example, the AP may lose medium synchronization (i.e., become blind) on M-Primary during frame exchange(s) on O-Primary. If a non-AP STA remains synchronized on M-Primary (e.g., using an additional radio such as an AUX radio), it can assist the AP in regaining medium synchronization.

The TXOP sharing information may assist an AP with access on O-Primary. For example, a non-AP STA with an additional radio (e.g., AUX) may be capable of accessing (i.e., contending for access to)O-Primary in parallel. The non-AP STA can use parallel contention to help the AP gain access to the O-Primary faster.

Figure 6:
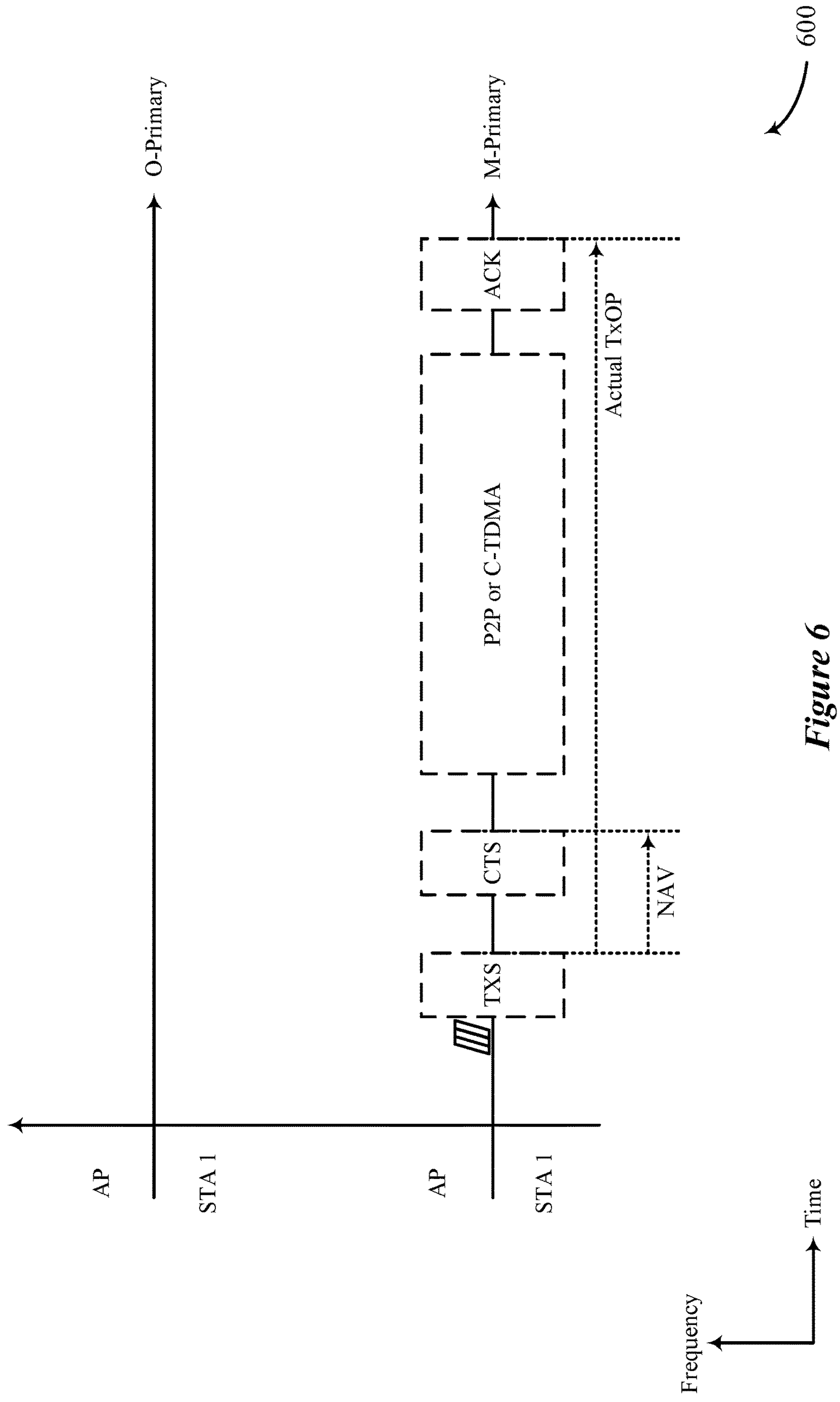
FIG. 6 shows an example of a resource diagram that supports techniques for multi-primary channel access according to some aspects of the present disclosure.

FIG. 6 shows an example of a resource diagram 600 that supports techniques for multi-primary channel access according to some aspects of the present disclosure. The resource diagram 600 may implement or be implemented by aspects of the WLAN 100 or the signaling diagram 300, as shown and described with reference to FIGS. 1 and 3. For example, some aspects of the resource diagram 600 may be implemented by a wireless AP (referred to hereinafter as the AP), such as the AP 102-*b* shown and described with reference to FIG. 3. Other aspects of the resource diagram 600 may be implemented by a wireless STA (referred to hereinafter as STA 1), such as the STA 104-*d* shown and described with reference to FIG. 3.

As described herein, UHR may support frame exchanges that have a short/modified NAV, such as for TXOP sharing in multi-AP, coordination, or low latency P2P. However, multi-primary channel access may rely on the OBSS NAV to determine whether (and how long) to utilize O-Primary. A short NAV can discourage an AP/STA from using O-Primary, and may also provide inaccurate information regarding how long the M-Primary will be occupied. In the example of FIG. 6, the AP may decode a PPDU while contending for access to M-Primary, and may determine that the PPDU corresponds to an OBSS. Accordingly, the, AP may store the shortened NAV for future reference. The short NAV may discourage the AP and STA 1 from switching to O-Primary for subsequent frame exchange(s), and subsequent P2P or C-TDMA communications from the OBSS may prevent the AP and STA1 from using M-Primary.

In accordance with aspects of the present disclosure, the short NAV frame (from the OBSS) may indicate whether the NAV corresponds to the actual OBSS TXOP duration on M-Primary. As used herein, the term "short NAV frame" may refer to any frame where the indicated NAV is different from (i.e., shorter than) the actual or expected TXOP duration. In particular, the short NAV frame may include a binary indication (such as whether the NAV is valid or not), an indication of the actual duration of the TXOP (including durations used by shared STAs), or an indication of how long the TXOP owner/initiator intends to use the TXOP (in which case the remaining duration of the TXOP is unknown). This indication may be provided in the preamble or PHY header of a TXOP sharing (TXS) frame. Reserved bits in a PHY header field can be repurposed, or a new field can be defined within a UHR PHY header. Additionally, or alternatively, the indication can be carried in a field of a MAC header. In other examples, a value of 127 can be signaled in the TXOP duration sub-field to notify neighbor devices (e.g., an AP or non-AP STA) to check the MAC payload to determine the true (i.e., actual) TXOP duration.

FIGS. 7A, 7B, 7C, and 7D show examples of a resource diagram 700, a resource diagram 701, a resource diagram 702, and a resource diagram 703, respectively, that support techniques for multi-primary channel access according to some aspects of the present disclosure. The resource diagrams 700 through 703 may implement or be implemented by aspects of the WLAN 100 or the signaling diagram 300, as shown and described with reference to FIGS. 1 and 3. For example, some aspects of the resource diagrams 700 through 703 may be implemented by a wireless AP, such as the AP 102-*b* shown and described with reference to FIG. 3. Other aspects of the resource diagram 700 through 703 may be implemented by a wireless STA, such as the STA 104-*d* shown and described with reference to FIG. 3.

As described herein, UHR may support frame exchanges that have a short/modified NAV, such as for TXOP sharing in multi-AP, coordination, or low latency P2P. However, multi-primary channel access may rely on the OBSS NAV to determine whether (and how long) to utilize O-Primary. A short or incomplete NAV can discourage an AP/STA from using O-Primary, and may also provide inaccurate information regarding how long the M-Primary will be occupied. Furthermore, one peer device (e.g., an AP) may switch to the O-Primary, while another peer device (e.g., a STA) may remain on O-Primary. As a result, the two peers may be unable to communicate with each other, resulting in inefficient use of the O-Primary channel.

In accordance with aspects of the present disclosure, the short NAV frame may provide an indication of whether the NAV corresponds to the actual TXOP duration on M-Primary. In particular, this indication may be a binary indication (such as whether the NAV is valid or not), an indication of the actual duration of the TXOP (including durations used by shared STAs), or an indication of how long the TXOP owner/initiator intends to use the TXOP (in which case the remaining duration of the TXOP is unknown). This indication may be in the preamble or PHY header of a TXOP sharing (TXS) frame. Reserved bits in a PHY header field can be repurposed, or a new field can be defined within a UHR PHY header. Additionally, or alternatively, the indication can be carried in a field of a MAC header. In other examples, a value of 127 can be signaled in the TXOP duration sub-field to notify a neighbor AP to check the MAC payload to determine the true (i.e., actual) TXOP duration.

In some implementations, the wireless device providing the indication may perform an adjustment of the indicated TXOP duration. For example, when the indication is not binary, subsequent frames in the frame exchange may adjust (i.e., reduce) the indicated TXOP duration. This adjustment may be similar to other NAV adjustments. For example, each frame sets the duration as (D−d−a*SIFS), where D is the indicated TXOP duration from the previous frame, d is the duration of the current frame, and a is determined from the frame exchange sequence. In some examples, subsequent frames can increase the indicated TXOP duration (e.g., if a TXOP extension is granted to one of the shared STAs).

If the indication is binary and indicates that the NAV is invalid (i.e., does not correspond to the actual TXOP duration), an AP that possesses an additional radio (e.g., AUX) may selectively perform trigger-based uplink frame exchanges to ensure that the main radio of the AP and the additional radio (e.g., AUX) of the AP are in an RX/RX state, thereby enabling the AP to remain synchronized on M-Primary. In some cases, however, the AP may still become blind (i.e., lose synchronization) on the M-Primary. For example, the AP may lose synchronization if the AP has a single radio and participates in uplink or downlink frame exchanges, or if the AP possesses an additional radio (e.g., AUX) and participates in downlink frame exchanges. If the AP becomes blind on M-Primary, the AP may perform blindness recovery (e.g., follow blindness recovery rules) to regain medium synchronization on M-Primary. Additionally, or alternatively, the AP may request assistance from associated STA(s) to recover from blindness if the AP knows that the STA(s) are synchronized on M-Primary (as described with reference to FIGS. 10A through 10C).

The short NAV (e.g., TXS) frame may also identify the transmitter (e.g., the shared AP or STA) during the duration. Multi-Primary capable STAs can use this information to determine whether to switch to O-Primary. If the transmitter on M-Primary is out of a preamble detection (PD) range of the Multi-primary STA, the Multi-Primary STA may refrain from switching to O-Primary (as depicted in the example of FIG. 7B). Instead, the STA can contend on M-Primary and transmit using the entire bandwidth (i.e., M-Primary and O-Primary). Otherwise, if the transmitter on M-Primary is within a PD range of the Multi-primary STA, the Multi-primary STA can switch to O-Primary (as depicted in the example of FIG. 7C). Alternatively, if the transmitter on M-Primary is the AP corresponding to a BSS of the Multi-primary STA, the Multi-primary STA can pause contention on both O-Primary and M-Primary (as depicted in the example of FIG. 7D) and wait for the TXOP to be shared with the AP.

In the resource diagrams 700 through 703, a first wireless device (AP 1) may receive, from a second wireless device (AP 2) via a first channel (M-Primary), a first indication (OBSS PDU) to assist the first wireless device in accessing a second channel (M-Primary or O-Primary) for the purpose of communicating with a third wireless device (STA 1). The first wireless device may communicate with at least the third wireless device via the second channel in accordance with the first indication from the second wireless device.

Figure 7A:
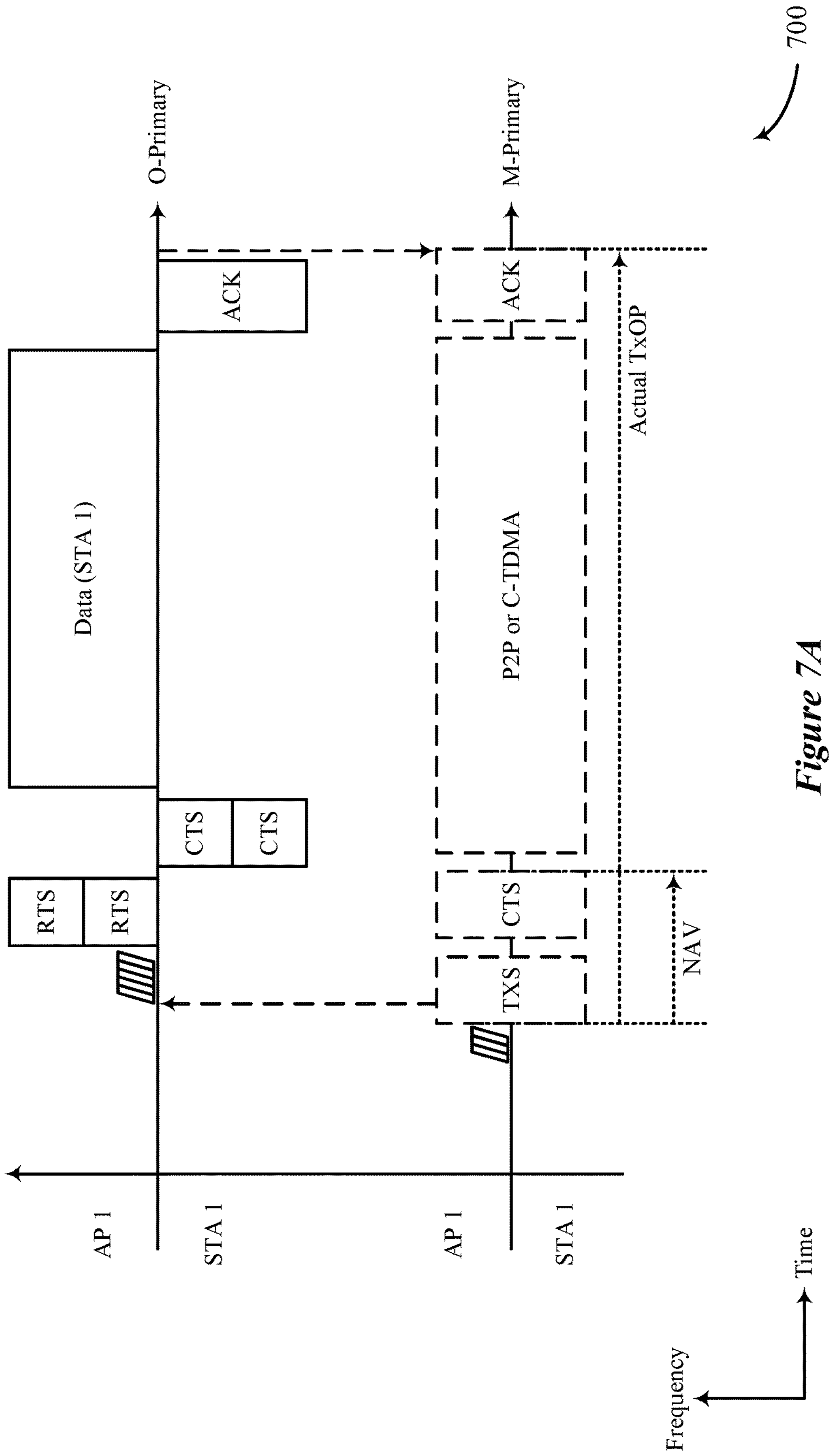
FIGS. 7A, 7B, 7C, and 7D show examples of resource diagrams that support techniques for multi-primary channel access according to some aspects of the present disclosure.
Figure 7B:
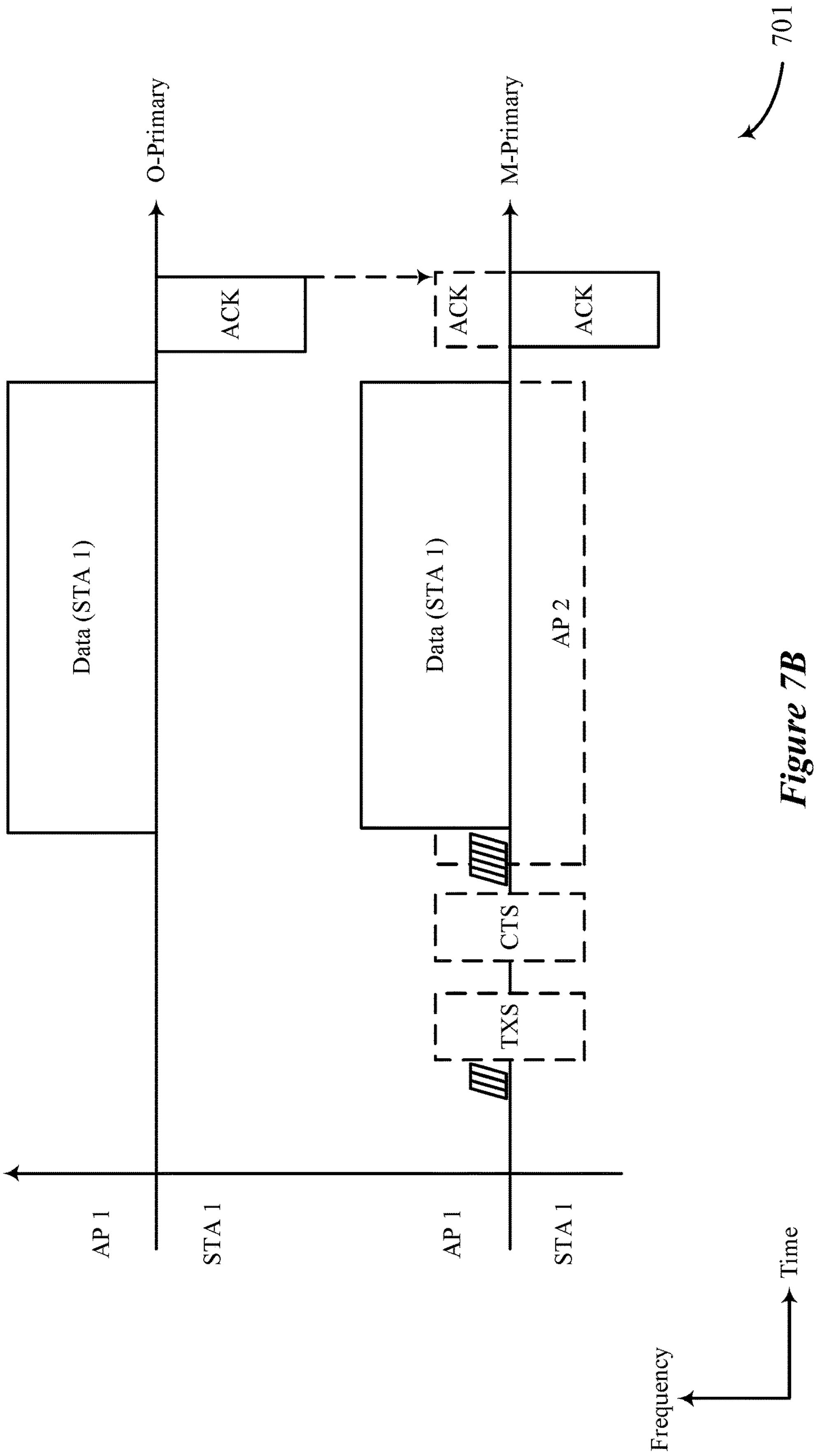
Figure 7C:
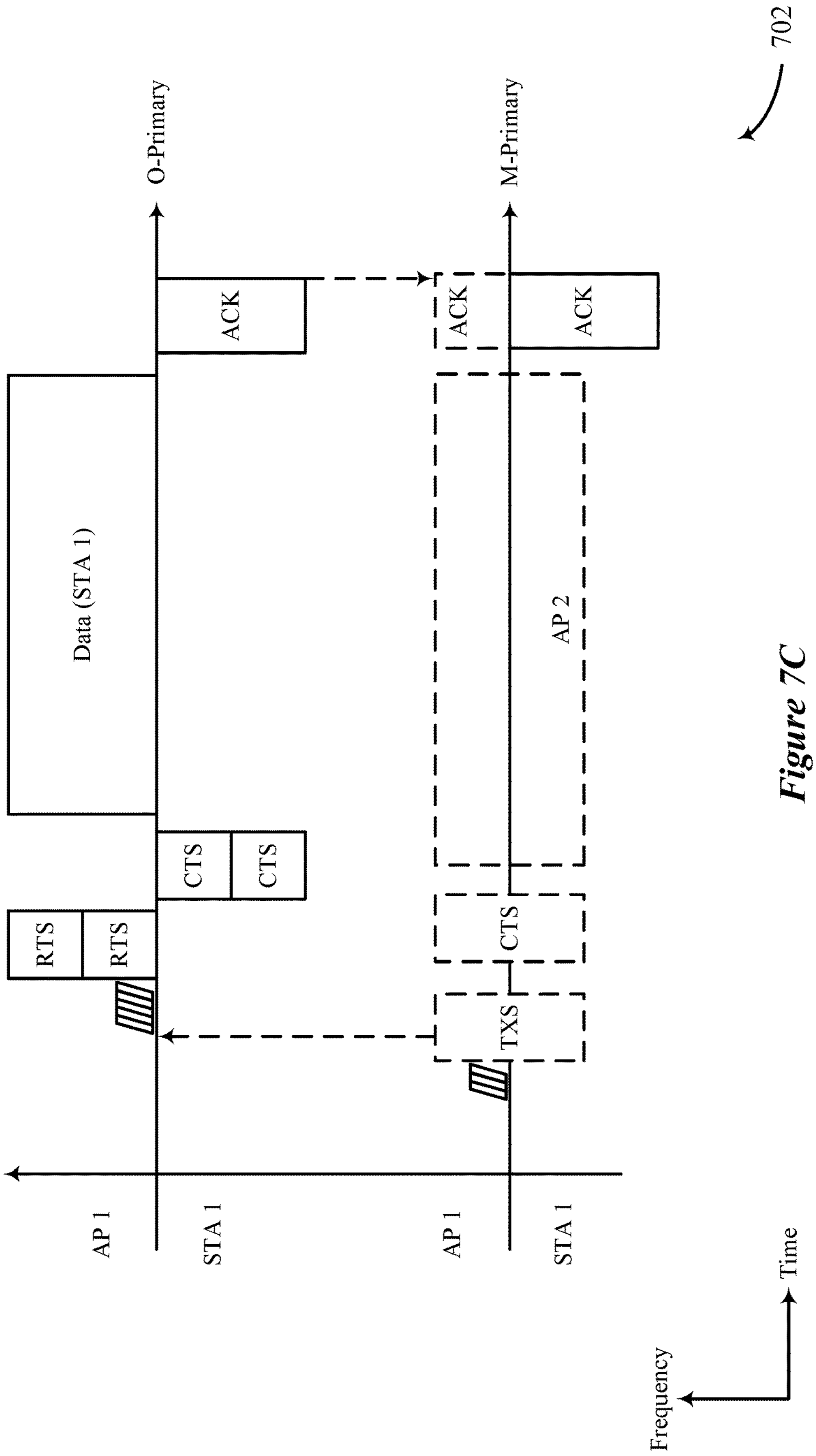
Figure 7D:
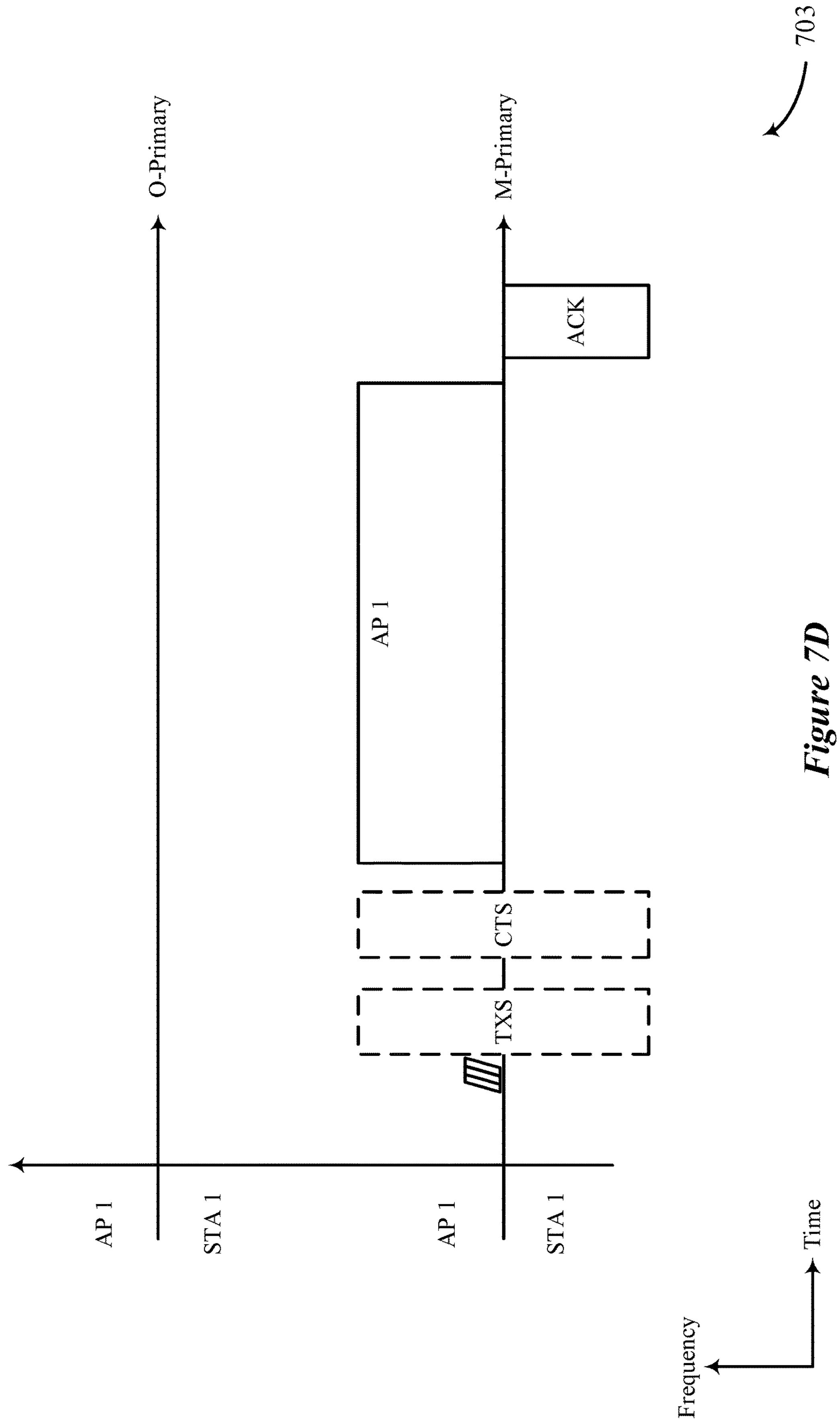

In the example of FIG. 7A, AP 1 may decode a PPDU while contending for access to M-Primary, and may determine that the PPDU is an OBSS PPDU. Accordingly, AP 1 may determine the actual TXOP duration from a TXS frame preamble, MAC payload, or MAC header. Accordingly, AP 1 and STA 1 may switch their respective radios to O-Primary and contend for access to the O-Primary channel. AP 1 may send an RTS frame to verity that STA 1 has also switched to O-Primary, and STA 1 may respond to the RTS frame with a CTS frame to confirm that STA 1 has switched to O-Primary. AP 1 and STA 1 may switch back to M-Primary before the OBSS NAV expires.

In the example of FIG. 7B, AP 1 may decode a PPDU while contending for access to M-Primary, and may determine that the PPDU is an OBSS PPDU. AP 1 may determine, from the TXS frame, that the TXOP is shared with AP 2, which is outside the PD range of AP 1. Accordingly, AP 1 may resume contention on M-Primary and utilize the entire channel bandwidth for wideband communications with STA 1.

In the example of FIG. 7C, AP 1 may decode a PPDU while contending for access to M-Primary, and may determine that the PPDU is an OBSS PPDU. AP 1 may determine, from the TXS frame, that the TXOP is shared with AP 2, which is within the PD range of AP 1. Accordingly, AP 1 and STA 1 may switch their respective radios to O-Primary, contend for access to O-Primary, and switch back to M-Primary before the OBSS NAV expires.

In the example of FIG. 7D, AP 1 may decode a PPDU while contending for access to M-Primary, and may determine that the PPDU is an OBSS PPDU. AP 1 may determine, from the TXS frame, that the TXOP is shared with AP 1. Accordingly, AP 1 and STA 1 may stop contention on M-Primary and wait for the TXOP to be shared with AP 1. After the TXOP is shared, AP 1 can flush downlink PPDUs to STA 1 or solicit uplink downlink PPDUs from AP 1.

Figure 8:
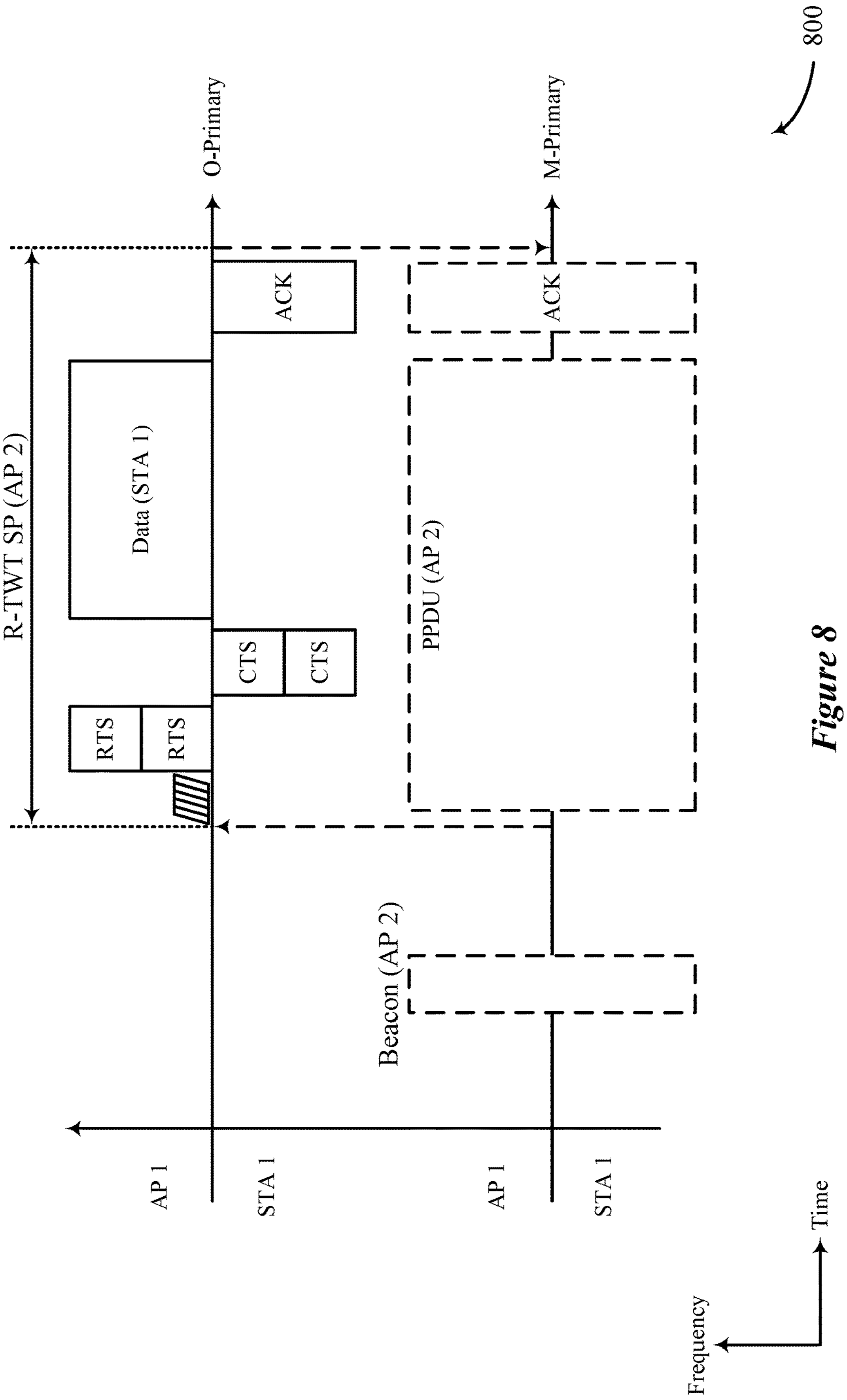
FIG. 8 shows an example of a resource diagram that supports techniques for multi-primary channel access according to some aspects of the present disclosure.

FIG. 8 shows an example of a resource diagram 800 that supports techniques for multi-primary channel access according to some aspects of the present disclosure. The resource diagram 800 may implement or be implemented by aspects of the WLAN 100 or the signaling diagram 300, as shown and described with reference to FIGS. 1 and 3. For example, some aspects of the resource diagram 800 may be implemented by a wireless AP, such as the AP 102-*b* shown and described with reference to FIG. 3. Other aspects of the resource diagram 800 may be implemented by a wireless STA, such as the STA 104-*d* shown and described with reference to FIG. 3.

As described herein, UHR may support coordination of R-TWTs amongst friendly APs. Such APs are expected to advertise their R-TWT information so friendly OBSS devices do not interfere with their R-TWT service periods. When an AP is aware that member(s) of an R-TWT service period will be using less than all of a channel bandwidth (based on the capability or bandwidth(s) of the members), the AP can indicate the bandwidth that will be used during the R-TWT service period(s). This information can help neighboring AP/STAs use O-primary (i.e., perform multi-primary channel access) during R-TWT service period(s). The bandwidth information can be advertised by the AP in Beacon frames, or Probe Response frames, or other frames where R-TWT-related information is advertised. Access to O-Primary may be contention-based (i.e., the AP/STA may countdown and send ICF). As such, opportunistic usage of O-Primary during R-TWT service periods may not cause synchronized collisions (i.e., where multiple devices attempt to access the medium at the same time and collide).

In the resource diagram 800, a first wireless device (AP 1) may receive, from a second wireless device (AP 2) via a first channel (M-Primary), a first indication (Beacon or Probe Response frame) to assist the first wireless device in accessing a second channel (O-Primary) for the purpose of communicating with a third wireless device (STA 1). The first wireless device may communicate with at least the third wireless device via the second channel in accordance with the first indication from the second wireless device. In the example of FIG. 8, a Beacon frame from AP 2 may indicate that an R-TWT service period of AP 2 will utilize only M-Primary. Accordingly, AP 1 and STA 1 may switch their respective radios to O-Primary and communicate via O-Primary during the R-TWT service period of AP 2.

Figure 9:
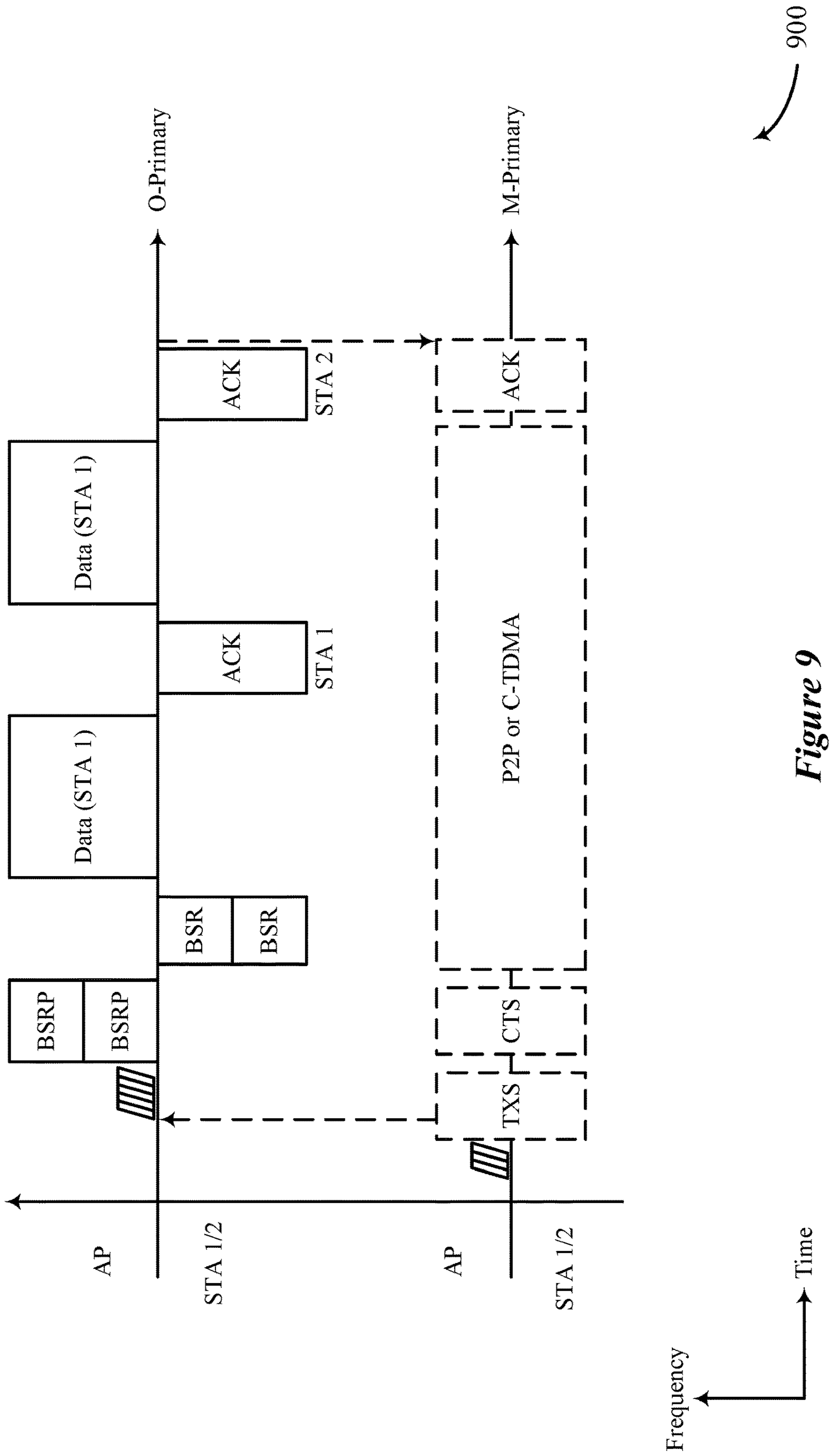
FIG. 9 shows an example of a resource diagram that supports techniques for multi-primary channel access according to some aspects of the present disclosure.

FIG. 9 shows an example of a resource diagram 900 that supports techniques for multi-primary channel access according to some aspects of the present disclosure. The resource diagram 900 may implement or be implemented by aspects of the WLAN 100 or the signaling diagram 300, as shown and described with reference to FIGS. 1 and 3. For example, some aspects of the resource diagram 900 may be implemented by a wireless AP, such as the AP 102-*b* shown and described with reference to FIG. 3. Other aspects of the resource diagram 600 may be implemented by a wireless STA, such as the STA 104-*c* shown and described with reference to FIG. 3.

When a non-AP STA detects that M-Primary is busy, the non-AP STA may switch to O-Primary. However, it may be unclear how long the non-AP STA should remain on O-Primary. The default option may be for the non-AP STA to remain on O-Primary until the end of the recorded OBSS NAV. However, this can result in higher power consumption at the non-AP STA, since the non-AP STA remains in an Rx-ready state on the O-Primary for a relatively long period of time. Thus, providing a mechanism by which the non-AP STA can turn off (i.e., exit) an Rx-ready state may result in greater power savings at the non-AP STA.

In accordance with the techniques described herein, the non-AP STA may, in some implementations, transition out of an Rx-ready state upon expiration of a timeout period (assuming the AP does not detect an OBSS PPDU on M-Primary). Instead, the non-AP STA may return to M-Primary and enter a low power mode until the end of the OBSS NAV on M-Primary. In other implementations, the AP may send a BSRP frame (as depicted in the resource diagram 900), an NFRP frame, or some other frame that identifies which non-AP STAs the AP intends to service during a TXOP on O-Primary.

In other words, the AP may indicate an intention to serve a particular STA within the TXOP, even if the STA is not immediately served. This indication may confirm that the AP and the non-AP STA(s) have the same view of M-primary. In some implementations, the indication may be provided in an ICF. Providing non-AP STAs with such information may also help non-AP STAs stop monitoring if they are not listed. Otherwise, the non-AP STAs may be unable to determine whether they will be served in the TXOP, and may be stuck waiting to be served by the AP if they detect at least one frame from the AP, even if the frame is intended for another STA. A non-AP STA can also employ intra-BSS PPDU power saving techniques if the AP has indicated an intention to serve the non-AP STA (via the ICF) but is currently serving another STA.

In the resource diagram 900, a first wireless device (STA 1/2) may receive, from a second wireless device (AP) via a first channel (O-Primary), a first indication (such as a BSRP frame, an ICF, or an NFRP frame) to assist the first wireless device in accessing a second channel (O-Primary) for the purpose of communicating with a third wireless device (AP). The first wireless device may communicate with at least the third wireless device via the second channel in accordance with the first indication from the second wireless device.

In the example of FIG. 9, the AP and STA 1/2 may contend on M-Primary, determine that the channel is occupied, switch their respective radios to O-Primary, and contend on O-Primary. Upon gaining access to O-Primary, the AP may advertise a BSRP or ICF addressed to STA 1/2, even if STA 1 is served first. In other words, the BSRP or ICF from the AP informs STA 2 that the AP intends to serve STA 2 on O-Primary during the TXOP after STA 1 is served. Accordingly, STA 1/2 may transmit respective BSR frames to confirm that STA 1/2 have switched to O-Primary. Thereafter, AP may serve AP 1/2 on O-Primary during the TXOP and switch back to M-Primary before the OBSS NAV period expires.

Figure 10A:
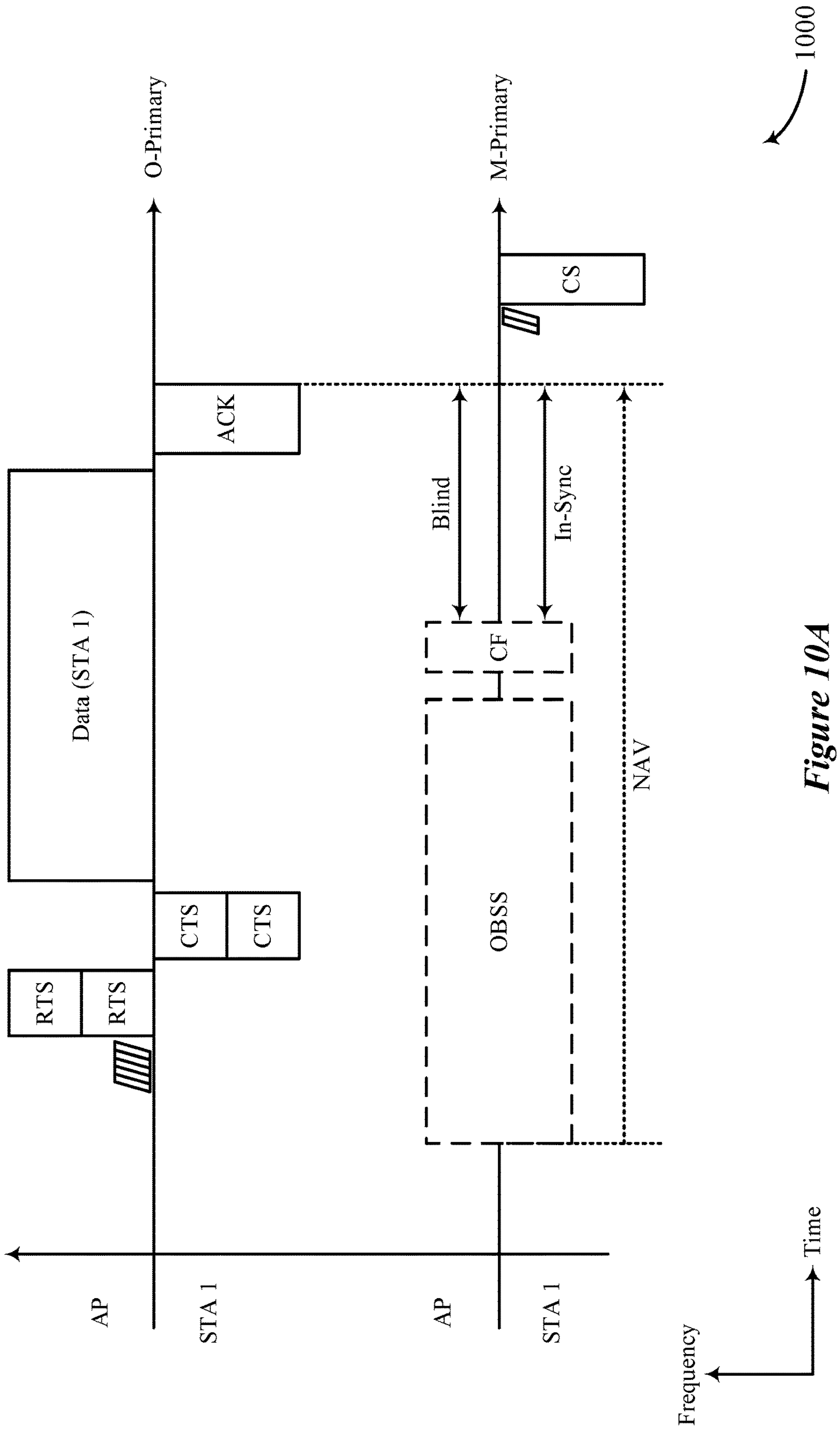
FIGS. 10A, 10B, and 10C show examples of resource diagrams that support techniques for multi-primary channel access according to some aspects of the present disclosure.
Figure 10B:
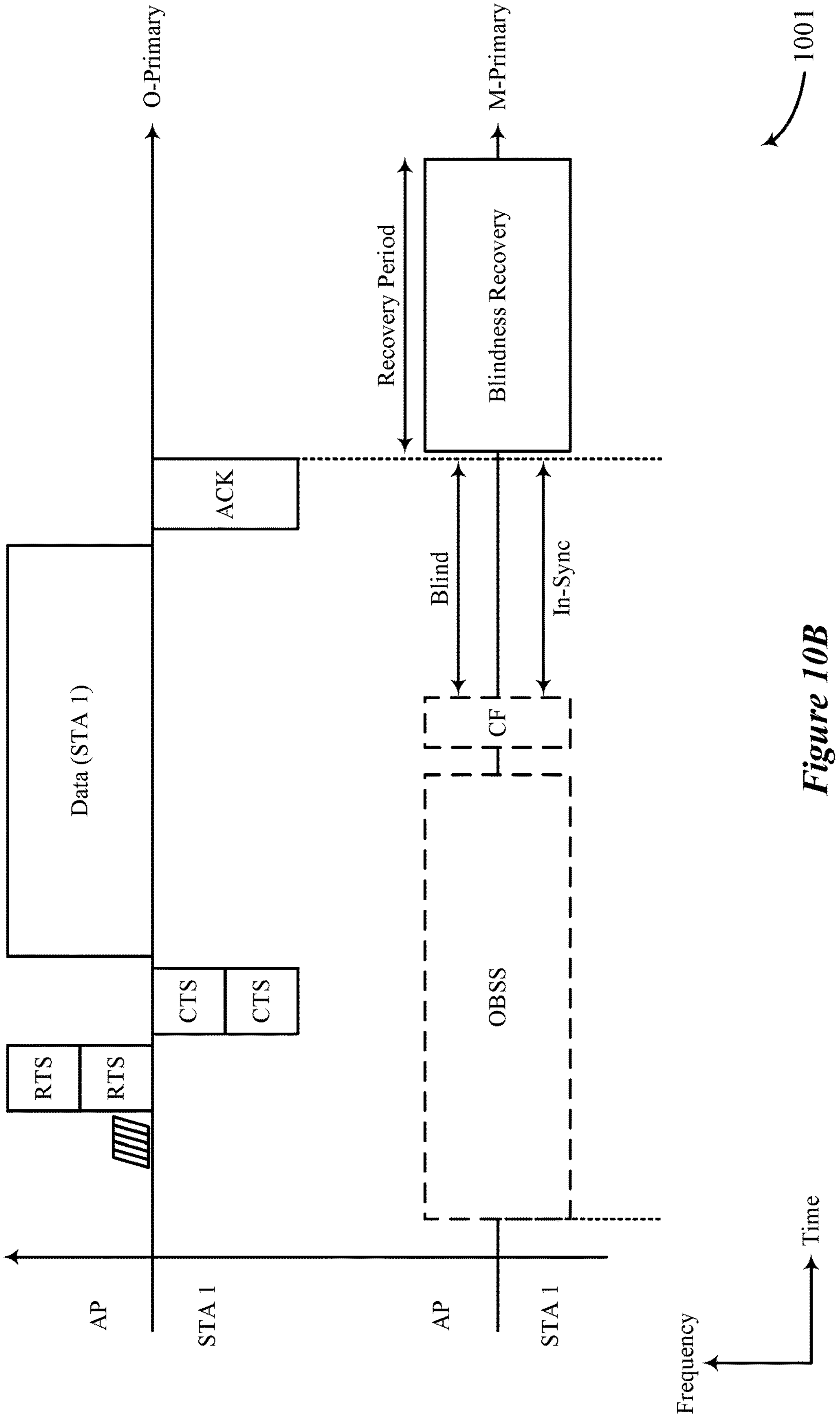
Figure 10C:
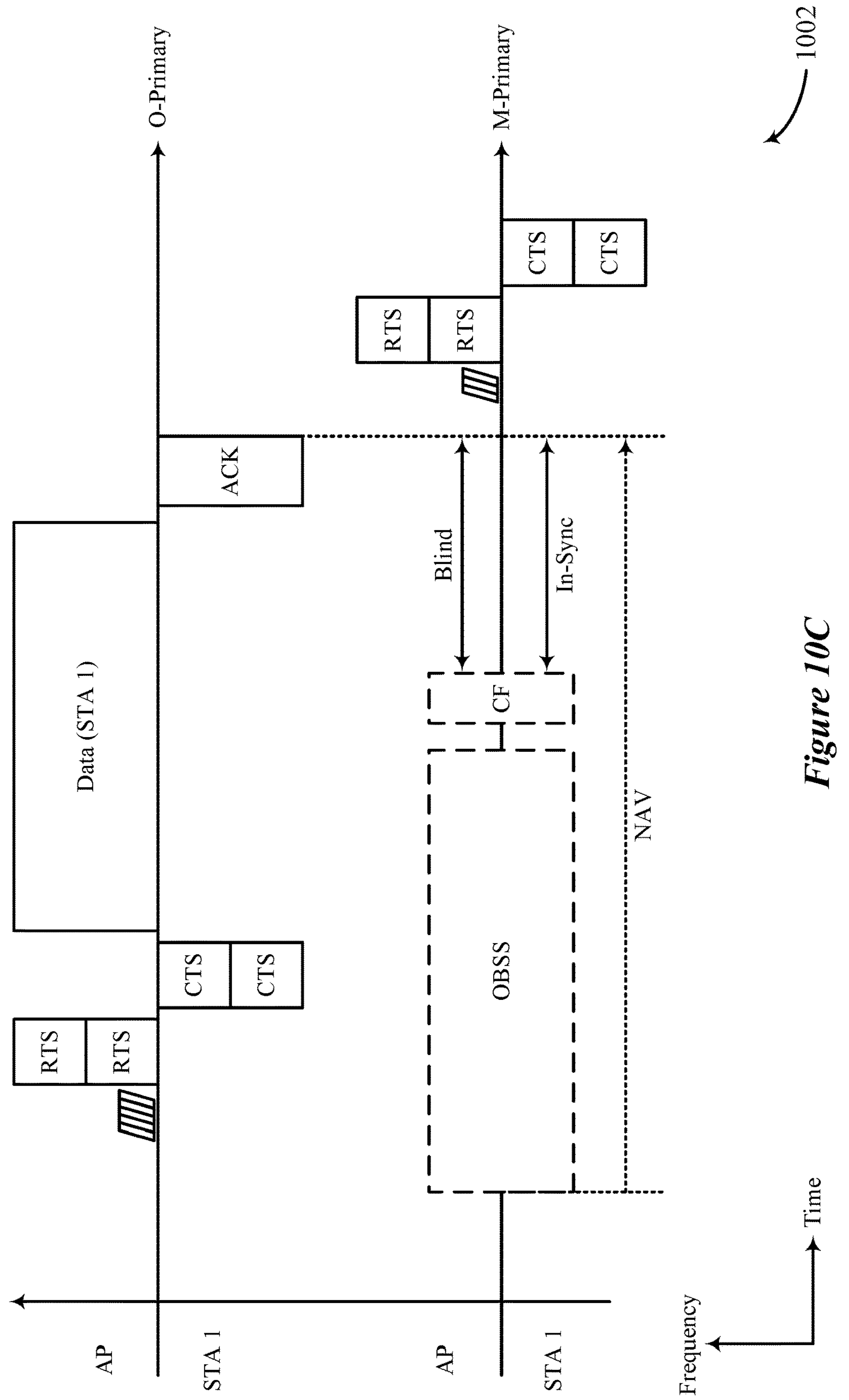

FIGS. 10A, 10B, and 10C show examples of a resource diagram 1000, a resource diagram 1001, and a resource diagram 1002, respectively, that support techniques for multi-primary channel access according to some aspects of the present disclosure. The resource diagrams 1000 through 1002 may implement or be implemented by aspects of the WLAN 100 or the signaling diagram 300, as shown and described with reference to FIGS. 1 and 3. For example, some aspects of the resource diagrams 1000 through 1002 may be implemented by a wireless AP (referred to hereinafter as the AP), such as the AP 102-*b* shown and described with reference to FIG. 3. Other aspects of the resource diagram 1000 through 1002 may be implemented by a wireless STA (referred to hereinafter as STA 1), such as the STA 104-*d* shown and described with reference to FIG. 3.

In some cases, the AP may lose synchronization on M-Primary, while STA 1 remains synchronized on M-primary. For example, STA 1 may possess an additional (e.g., AUX) radio that enables STA 1 to remain synchronized with M-Primary. The AP may lose medium synchronization due to transmission(s) on O-Primary, or due to having a single radio. In such cases, STA 1 can help the AP with medium synchronization recovery. In some implementations, STA 1 (also referred to herein as the client) can help the AP regain medium synchronization on M-Primary after a TXOP on O-Primary ends (as depicted in the resource diagram 1000). For instance, STA 1 may transmit a frame (e.g., CTS2Self or QoS Null) that enables the AP to regain medium synchronization on M-primary.

In other implementations, STA 1 may inform the AP of whether the AP lost medium synchronization on M-Primary during the TXOP on O-Primary (as depicted in the resource diagram 1001). For example, STA 1 may notify the AP (e.g., via an ACK frame on O-primary) that an OBSS STA terminated a TXOP by transmitting a CF-End frame. In other implementations, the AP may send a frame that solicits an immediate response from STA 1 (as depicted in the resource diagram 1002). For example, if the AP knows that STA 1 is in sync on M-Primary (e.g., because STA 1 has an AUX radio), the AP may send an RTS frame (after the TXOP on O-primary ends) to solicit a CTS from STA 1 and regain medium synchronization on M-Primary. The AP may use a lower energy detection threshold when sending RTS frame(s). The described techniques may be based on a capability exchange between the AP and STA 1. In some implementations, the AP may explicitly request assistance from STA 1 via an A-Control field on O-Primary. The described techniques may assume that STA 1 was a participant in the TXOP on O-Primary. However, a STA that did not participate in a TXOP on O-Primary (e.g., a legacy STA that does not support multi-primary channel access but is synchronized on the M-Primary channel) may also assist the AP in regaining medium synchronization on O-Primary.

In the resource diagrams 1000 through 1002, a first wireless device (AP) may receive, from a second wireless device (STA 1) via a first channel (M-Primary or O-Primary), a first indication (such as an ACK frame on O-Primary, a CTS frame on M-Primary, a CTS2Self frame on M-Primary, or a QoS Null frame on M-Primary) to assist the first wireless device in accessing a second channel (M-Primary) for the purpose of communicating with a third wireless device (STA 1). The first wireless device may communicate with at least the third wireless device via the second channel in accordance with the first indication from the second wireless device.

In the example of FIG. 10A, the AP (e.g., a wireless device with a single radio) and STA 1 (e.g., a wireless device with a main radio and an AUX radio) may detect an OBSS PPDU on M-Primary and switch their main radios to O-Primary until the end of the OBSS NAV. If the AP fails to detect a CF-End frame on M-Primary but the CF-End frame is detected by STA 1 (indicating that AP is blind and STA 1 is in-sync), STA 1 may transmit a CTS2Self frame to assist the AP in recovering from blindness on M-Primary.

In the example of FIG. 10B, the AP and STA 1 may detect an OBSS PPDU on M-Primary and switch their main radios to O-Primary until the end of the OBSS NAV. If the AP fails to detect a CF-End frame on M-Primary but the CF-End frame is detected by STA 1 (indicating that the AP is blind and STA 1 is in-sync), STA 1 may include, in an ACK frame, an indication that the OBSS TXOP was terminated sooner than expected (i.e., prior to the time indicated by the OBSS NAV). In response to the indication from STA 1, the AP may perform one or more blindness recovery measures during a blindness recovery period. Such measures may include performing energy detection on M-Primary using a lower threshold (such as −72 dBm), initiating subsequent frames on M-Primary with an RTS, refraining from initiating additional frame exchanges on M-Primary if an RTS/CTS frame exchange on M-Primary is unsuccessful, etc. Alternatively, the AP may, after returning to M-Primary, transmit a frame that solicits an immediate response from a STA that is has maintained medium synchronization with the M-Primary channel.

In the example of FIG. 10C, the AP and STA 1 may detect an OBSS PPDU on M-Primary and switch their main radios to O-Primary until the end of the OBSS NAV. If the AP fails to detect a CF-End frame on M-Primary but the CF-End frame is detected by STA 1 (indicating that the AP is blind and STA 1 is in-sync), the AP may be unaware that it has lost synchronization on M-Primary. However, if the AP knows that STA 1 is synchronized on M-Primary, the AP may send an RTS frame to STA 1. The AP may use a lower energy detection threshold (such as −72 dBm) for channel contention purposes. STA 1 may respond with a CTS frame, which may help the AP recover synchronization on M-Primary.

Figure 11:
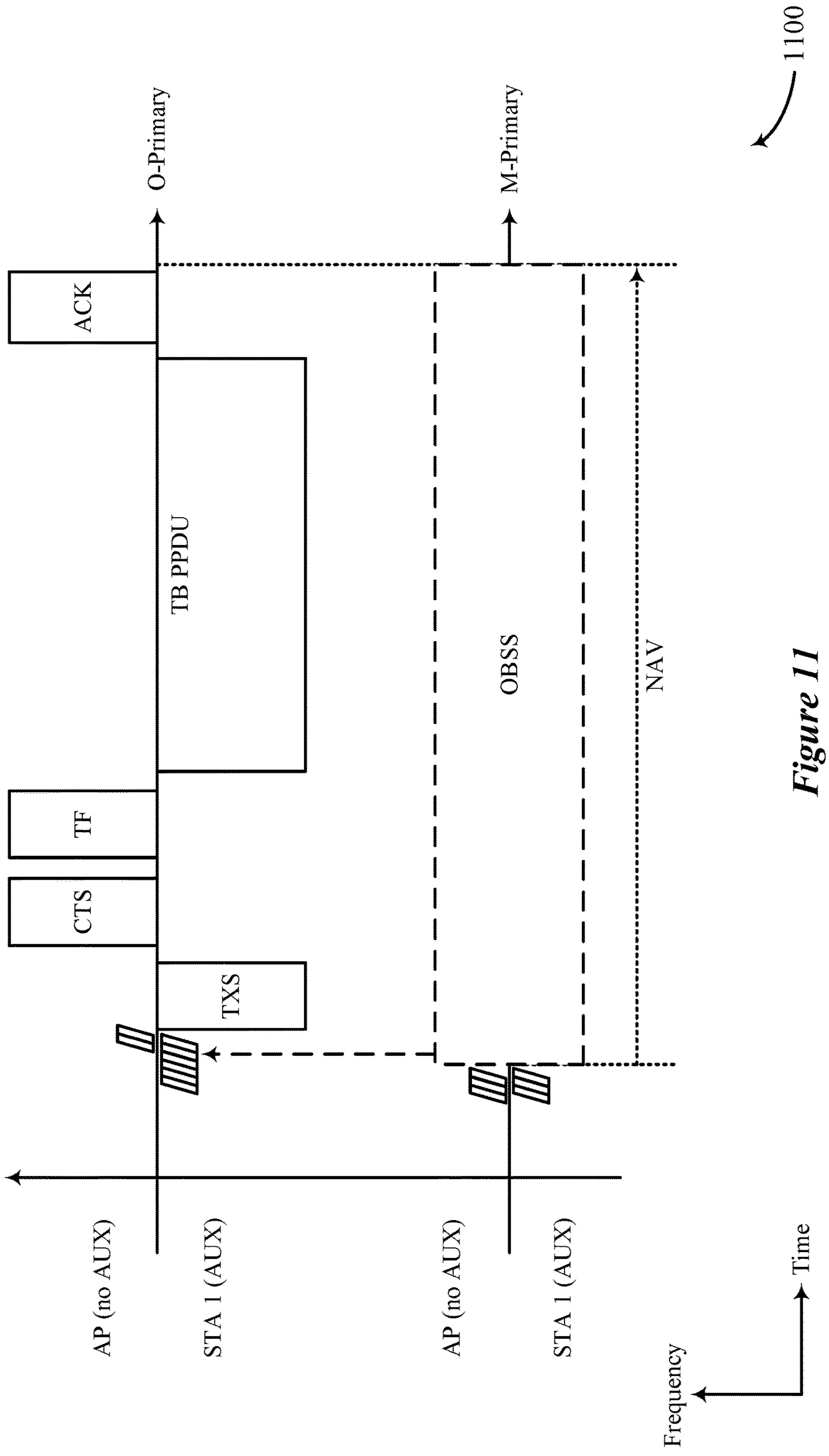
FIG. 11 shows an example of a resource diagram that supports techniques for multi-primary channel access according to some aspects of the present disclosure.

FIG. 11 shows an example of a resource diagram 1100 that supports techniques for multi-primary channel access according to some aspects of the present disclosure. The resource diagram 1100 may implement or be implemented by aspects of the WLAN 100 or the signaling diagram 300, as shown and described with reference to FIGS. 1 and 3. For example, some aspects of the resource diagram 1100 may be implemented by a wireless AP (referred to hereinafter as the AP), such as the AP 102-*b* shown and described with reference to FIG. 3. Other aspects of the resource diagram 1100 may be implemented by a wireless STA (referred to hereinafter as STA 1), such as the STA 104-*d* shown and described with reference to FIG. 3.

If the AP has no additional (e.g., AUX) radio, the AP may perform sequential CCA(s) on each O-primary channel. Sequential CCA may delay access to O-Primary. On the other hand, if STA 1 has an AUX radio, STA 1 can start contending on O-Primary as soon as an OBSS PPDU is detected on M-Primary. Switching the AUX radio of STA 1 from M-Primary to O-Primary may not cause delays. In some cases, STA 1 may continue to contend on O-Primary, even if M-primary is idle. As a result, STA 1 may gain access to O-Primary sooner than the AP (e.g., for scenarios where the AP has a single radio). In such examples, STA 1 can assist the AP in accessing O-Primary.

If STA 1 has at least one uplink PPDU to transmit when STA 1 gains access to O-Primary, STA 1 may flush its queue without sharing the TXOP with the AP. Alternatively, STA 1 can flush its queue and transfer/share the TXOP with the AP. In other implementations, STA 1 can transfer/share the TXOP to the AP without flushing its queue and request to be triggered (e.g., by including a BSR or an explicit indication in a TXS frame).

In some implementations, STA 1 may be aware of a pending frame in the AP's queue that is intended for STA 1. For example, STA 1 may be in a power saving mode, and the AP may transmit a beacon frame that includes a traffic indication map (TIM) bit set to 1 for STA 1. In such cases, when STA 1 gains access to O-Primary, STA 1 may send a PS-Poll or QoS Null frame to retrieve buffered PPDUs from the AP without sharing the TXOP to the AP. Alternatively, STA 1 can send a PS-Poll or QoS Null frame to retrieve the buffered PPDUs and then transfer/share the TXOP with the AP. In other cases, STA 1 can transfer/share the TXOP with the AP and then request that the AP release the buffered BUs to STA 1.

If STA 1 does not have any pending frames, and is not aware of any pending frame in the AP's queue that are destined for STA 1, STA 1 may contend for O-Primary and, in response to gaining access to O-Primary, may transfer/share the TXOP with the AP and request that all buffered BUs be released to STA 1. In some implementations, STA 1 may use a combination of the described techniques after gaining access to O-Primary. For example, if STA 1 has buffered uplink PPDU(s) and is also aware of a pending downlink PPDU in the AP's buffer, STA 1 may transfer/share the TXOP with the AP, request to be triggered, and request buffered BUs to be released. To share or transfer the TXOP with the AP, STA 1 may use a Reverse Direction Grant (RDG), a TXS frame, or other mechanisms defined in UHR to transfer the TXOP to the AP.

In the resource diagram 1100, a first wireless device (AP) may receive, from a second wireless device (STA 1) via a first channel (O-Primary), a first indication (TXS frame) to assist the first wireless device in accessing a second channel (O-Primary) for the purpose of communicating with a third wireless device (STA 1). The first wireless device may communicate with at least the third wireless device via the second channel in accordance with the first indication from the second wireless device.

In the example of FIG. 11, the AP (e.g., a wireless device with a single radio) and STA 1 (e.g., a wireless device with a main radio and an AUX radio) may contend for access to M-Primary. While contending for access to M-Primary (e.g., using a main radio), STA 1 may also contend on O-Primary (e.g., using an AUX radio). Thereafter, AP and STA 1 may detect an OBSS PDU on M-Primary and switch their respective main radios to O-Primary until the end of the OBSS NAV. If STA 1 gains access to O-Primary first (e.g., by contending on both channels in parallel), STA 1 may share the TXOP with the AP via a TXS frame or a similar frame defined in UHR. In some implementations, the TXS frame may further include a request for the AP to trigger an uplink PPDU from STA 1. Accordingly, AP may transmit a trigger frame to solicit the uplink PPDU from STA 1 and switch back to M-Primary before the OBSS NAV expires.

Figure 12:
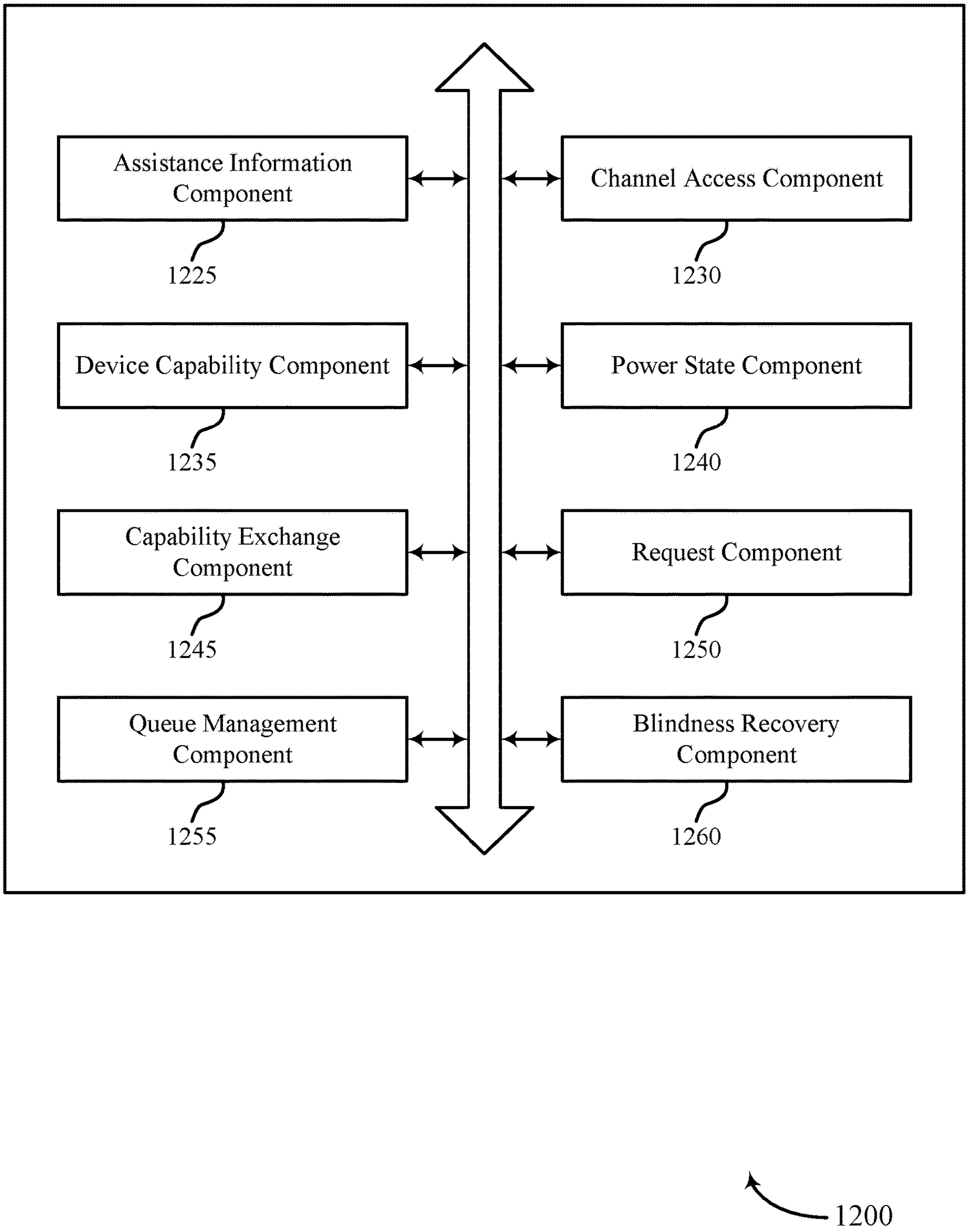
FIG. 12 shows a block diagram of an example wireless communication device that supports techniques for multi-primary channel access according to some aspects of the present disclosure.

FIG. 12 shows a block diagram of an example wireless device 1200 that supports techniques for multi-primary channel access according to some aspects of the present disclosure. In various examples, the wireless device 1200 can be a chip, SoC, chipset, package or device that may include: one or more modems (such as, a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

In some examples, the wireless device 1200 can be a device for use in an AP or STA, such as AP 102 or STA 104 described with reference to FIG. 1. In some other examples, the wireless device 1200 can be an AP or STA that includes such a chip, SoC, chipset, package, or device as well as multiple antennas. The wireless device 1200 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some examples, the wireless device 1200 also includes or can be coupled with an application processor which may be further coupled with another memory. In some examples, the wireless device 1200 further includes at least one external network interface that enables communication with a core network or backhaul network to gain access to external networks including the Internet.

The wireless device 1200 includes an assistance information component 1225, a channel access component 1230, a device capability component 1235, a power state component 1240, a capability exchange component 1245, a request component 1250, a queue management component 1255, and a blindness recovery component 1260. Portions of the one or more of the assistance information component 1225, the channel access component 1230, the device capability component 1235, the power state component 1240, the capability exchange component 1245, the request component 1250, the queue management component 1255, and the blindness recovery component 1260 may be implemented at least in part in the hardware or firmware. For example, one or more of the assistance information component 1225, the channel access component 1230, the device capability component 1235, the power state component 1240, the capability exchange component 1245, the request component 1250, the queue management component 1255, and the blindness recovery component 1260 may be implemented at least in part by a modem.

In some examples, at least some of the assistance information component 1225, the channel access component 1230, the device capability component 1235, the power state component 1240, the capability exchange component 1245, the request component 1250, the queue management component 1255, and the blindness recovery component 1260 are implemented at least in part by a processor and as software stored in memory. For example, portions of one or more of the assistance information component 1225, the channel access component 1230, the device capability component 1235, the power state component 1240, the capability exchange component 1245, the request component 1250, the queue management component 1255, and the blindness recovery component 1260 can be implemented as non-transitory instructions (or "code") executable by the processor to perform the functions or operations of the respective module.

In some implementations, the processor may be a component of a processing system. A processing system may generally refer to a system or series of machines or components that receives inputs and processes the inputs to produce a set of outputs (which may be passed to other systems or components of, for example, the wireless device 1200). For example, a processing system of the wireless device 1200 may refer to a system including the various other components or subcomponents of the wireless device 1200, such as the processor, or a transceiver, or a communications manager, or other components or combinations of components of the wireless device 1200. The processing system of the wireless device 1200 may interface with other components of the wireless device 1200, and may process information received from other components (such as inputs or signals) or output information to other components. For example, a chip or modem of the wireless device 1200 may include a processing system, a first interface to output information and a second interface to obtain information.

In some implementations, the first interface may refer to an interface between the processing system of the chip or modem and a transmitter, such that the wireless device 1200 may transmit information output from the chip or modem. In some implementations, the second interface may refer to an interface between the processing system of the chip or modem and a receiver, such that the wireless device 1200 may obtain information or signal inputs, and the information may be passed to the processing system. A person having ordinary skill in the art will readily recognize that the first interface also may obtain information or signal inputs, and the second interface also may output information or signal outputs.

One or more aspects of the present disclosure may support wireless communication at a first wireless device (such as the wireless device 1200) in accordance with examples disclosed herein. The assistance information component 1225 is capable of, configured to, or operable to support a means for receiving, from a second wireless device via a first channel, a first indication to assist the first wireless device in accessing a second channel for communication with at least one of a third wireless device. The channel access component 1230 is capable of, configured to, or operable to support a means for communicating with the at least one of the third wireless device via the second channel based on accessing the second channel in accordance with the first indication from the second wireless device.

In some examples, the first wireless device is a first AP or a first STA that supports multi-primary channel access, eMLSR, or both. In some examples, the second wireless device is a second AP or a second STA associated with an OBSS. In some examples, one or both of the first wireless device or the second wireless device are capable of operating non-concurrently on the first channel and the second channel. In some examples, the first indication from the second wireless device is indicative of timing information that pertains to a NAV associated with a TXOP on the first channel.

In some examples, to support receiving the first indication, the assistance information component 1225 is capable of, configured to, or operable to support a means for receiving, from the second wireless device via the first channel, a binary indication pertaining to whether the NAV corresponds to an actual duration of the TXOP.

In some examples, to support communicating with the at least one of the third wireless device, the channel access component 1230 is capable of, configured to, or operable to support a means for monitoring the first channel using a first radio of the first wireless device when the actual duration of the TXOP differs from a duration of the NAV.

In some examples, to support communicating with the at least one of the third wireless device, the channel access component 1230 is capable of, configured to, or operable to support a means for receiving, via the second channel, one or more trigger-based uplink communications from a STA using a second radio of the first wireless device.

In some examples, to support receiving the first indication, the assistance information component 1225 is capable of, configured to, or operable to support a means for receiving, from the second wireless device via the first channel, the timing information that pertains to an actual duration of the TXOP, where the actual duration of the TXOP includes time durations used by all STAs participating in the TXOP.

In some examples, the timing information is adjusted in frames transmitted by the second wireless device subsequent to transmission of the first indication. In some examples, an effective duration of the TXOP is increased in frames transmitted by the second wireless device subsequent to transmission of the first indication. In some examples, the effective duration of the TXOP is increased as a result of a TXOP extension being granted to one or more STAs participating in the TXOP.

In some examples, to support receiving the first indication, the assistance information component 1225 is capable of, configured to, or operable to support a means for receiving, from the second wireless device via the first channel, the timing information that pertains to a time duration for which the second wireless device intends to use the first channel.

In some examples, the first indication is provided in a preamble, a PHY header, a MAC header, or a MAC payload of a frame from the second wireless device.

In some examples, to support receiving the first indication, the assistance information component 1225 is capable of, configured to, or operable to support a means for receiving, from the second wireless device via the first channel, the timing information that identifies one or more shared APs or STAs that intend to use the first channel during the TXOP.

In some examples, the channel access component 1230 is capable of, configured to, or operable to support a means for performing a channel contention procedure to gain access to the first channel based on a determination that the one or more shared APs or STAs are outside a PD range of the second wireless device.

In some examples, the channel access component 1230 is capable of, configured to, or operable to support a means for switching from the first channel to the second channel based on a determination that the one or more shared APs or STAs are within a PD range of the second wireless device.

In some examples, the channel access component 1230 is capable of, configured to, or operable to support a means for refraining from contending for access to the first channel or the second channel based on a determination that the one or more shared APs or STAs include an AP associated with a basic service set (BSS) of the second wireless device.

In some examples, the first wireless device is a first AP or a STA that supports multi-primary channel access, eMLSR, or both. In some examples, the second wireless device is a second AP associated with an OBSS.

In some examples, one or both of the first wireless device or the second wireless device are capable of operating non-concurrently on the first channel and the second channel. In some examples, the first indication from the second wireless device includes bandwidth information that pertains to an R-TWT service period of the second AP associated with the OBSS.

In some examples, to support receiving the first indication, the assistance information component 1225 is capable of, configured to, or operable to support a means for receiving, from the second AP via the first channel, the bandwidth information pertaining to a bandwidth the second AP intends to use during the R-TWT service period, where the bandwidth includes the first channel and excludes the second channel.

In some examples, the bandwidth information is provided in a beacon frame or a probe response frame from the second AP. In some examples, the first wireless device is a STA that supports multi-primary channel access, eMLSR, or both. In some examples, the second wireless device is an AP that supports multi-primary channel access, eMLSR, or both.

In some examples, the at least one of the third wireless device includes the AP. In some examples, the first channel is the second channel. In some examples, the first indication from the second wireless device includes scheduling information that pertains to a set of STAs the AP intends to serve during a TXOP on the second channel.

In some examples, the power state component 1240 is capable of, configured to, or operable to support a means for transitioning from a first power state to a second power state based on an expiration of a timeout period associated with monitoring the second channel, where the first power state includes a receive ready state that consumes more power than the second power state.

In some examples, the channel access component 1230 is capable of, configured to, or operable to support a means for switching from the second channel to a third channel based on transitioning from the first power state to the second power state. In some examples, the power state component 1240 is capable of, configured to, or operable to support a means for remaining in the second power state until the third channel becomes available.

In some examples, to support receiving the first indication, the assistance information component 1225 is capable of, configured to, or operable to support a means for receiving, from the AP via the second channel, a frame identifying one or more non-AP STAs the AP intends to serve on the second channel during the TXOP.

In some examples, the channel access component 1230 is capable of, configured to, or operable to support a means for refraining from monitoring the second channel based on a determination that the STA is absent from the set of STAs the AP intends to serve on the second channel during the TXOP.

In some examples, the power state component 1240 is capable of, configured to, or operable to support a means for performing an intra-BSS PPDU power saving operation while the AP is serving other STAs on the second channel during the TXOP.

In some examples, the first wireless device is an AP that supports multi-primary channel access, eMLSR, or both. In some examples, the second wireless device is a STA that supports multi-primary channel access, eMLSR, or both. In some examples, the at least one of the third wireless device includes the STA. In some examples, the first indication from the second wireless device includes synchronization information to assist the AP in regaining synchronization on the first channel.

In some examples, to support receiving the first indication, the assistance information component 1225 is capable of, configured to, or operable to support a means for receiving, from the STA via the first channel, a frame to assist the AP in regaining synchronization on the first channel after a TXOP on the second channel.

In some examples, to support receiving the first indication, the assistance information component 1225 is capable of, configured to, or operable to support a means for receiving, from the STA via the second channel, an ACK frame indicating that a second STA associated with an OBSS terminated a TXOP on the first channel, or that the AP has lost synchronization on the first channel, or both.

In some examples, the blindness recovery component 1260 is capable of, configured to, or operable to support a means for performing one or more blindness recovery measures after receiving the ACK frame from the STA, where the one or more blindness recovery measures include using a lower energy detection threshold for channel contention, initiating frame exchanges with an RTS frame, or refraining from initiating subsequent frame exchanges after a failed exchange of RTS and CTS frames.

In some examples, the assistance information component 1225 is capable of, configured to, or operable to support a means for transmitting an RTS frame via the first channel to solicit a CTS frame from the STA based on a determination that the STA is synchronized on the first channel, where the CTS frame includes the first indication to assist the AP in regaining synchronization on the first channel.

In some examples, the capability exchange component 1245 is capable of, configured to, or operable to support a means for performing a capability exchange with the STA, where receiving the synchronization information from the STA is based on the capability exchange.

In some examples, the request component 1250 is capable of, configured to, or operable to support a means for transmitting, via the second channel, a request for the STA to assist the AP in regaining synchronization on the first channel, where receiving the first indication from the STA is based on the request.

In some examples, the assistance information component 1225 is capable of, configured to, or operable to support a means for receiving, from a STA that did not participate in a TXOP on the second channel, information to assist the AP in regaining synchronization on the second channel.

In some examples, the first wireless device is an AP that supports multi-primary channel access, eMLSR, or both. In some examples, the second wireless device is a STA that supports multi-primary channel access, eMLSR, or both. In some examples, the at least one of the third wireless device includes the STA. In some examples, the first channel is the second channel. In some examples, the first indication from the second wireless device transfers at least a portion of a TXOP on the second channel from the STA to the AP.

In some examples, the channel access component 1230 is capable of, configured to, or operable to support a means for receiving, from the STA via the second channel, a request for the AP to trigger transmission of an uplink PPDU from the STA. In some examples, the channel access component 1230 is capable of, configured to, or operable to support a means for transmitting, in response to the request, a trigger frame that triggers the STA to transmit the uplink PPDU via the second channel.

In some examples, the channel access component 1230 is capable of, configured to, or operable to support a means for transmitting a beacon frame that includes a TIM bit corresponding to the STA.

In some examples, the channel access component 1230 is capable of, configured to, or operable to support a means for receiving a second frame from the STA, where the TXOP is transferred from the STA to the AP after reception of the second frame.

In some examples, the channel access component 1230 is capable of, configured to, or operable to support a means for transmitting, via the second channel, one or more buffered PPDUs to the STA during the TXOP in accordance with the second frame.

In some examples, the channel access component 1230 is capable of, configured to, or operable to support a means for receiving, from the STA, a request for the AP to release one or more BUs to the STA after the TXOP is transferred to the AP.

In some examples, to support receiving the first indication, the channel access component 1230 is capable of, configured to, or operable to support a means for receiving, from the STA via the second channel, an RDG or a frame that transfers the TXOP to the AP.

Additionally, or alternatively, aspects of the present disclosure may support wireless communication at a second wireless device (such as the wireless device 1200) in accordance with examples disclosed herein. In some examples, the assistance information component 1225 is capable of, configured to, or operable to support a means for transmitting, via a first channel, a first indication to assist a first wireless device in accessing a second channel for communication with the second wireless device. In some examples, the channel access component 1230 is capable of, configured to, or operable to support a means for communicating with the first wireless device via the second channel based on assisting the first wireless device to access the second channel in accordance with the first indication from the second wireless device.

In some examples, the first wireless device is an AP that supports multi-primary channel access, eMLSR, or both. In some examples, the second wireless device is a STA that supports multi-primary channel access, eMLSR, or both.

In some examples, the first indication from the second wireless device transfers at least a portion of a TXOP on the second channel from the STA to the AP.

In some examples, the channel access component 1230 is capable of, configured to, or operable to support a means for performing a channel contention procedure to gain access to the second channel based on detecting an OBSS PPDU on the first channel, where transmitting the first indication is based on gaining access to the second channel.

In some examples, the queue management component 1255 is capable of, configured to, or operable to support a means for flushing a queue of the STA after gaining access to the second channel, where the TXOP is transferred to the AP after the queue is flushed.

In some examples, the channel access component 1230 is capable of, configured to, or operable to support a means for transmitting, via the second channel, a request for the AP to release one or more BUs to the STA based on transferring the TXOP to the AP.

Figure 13:
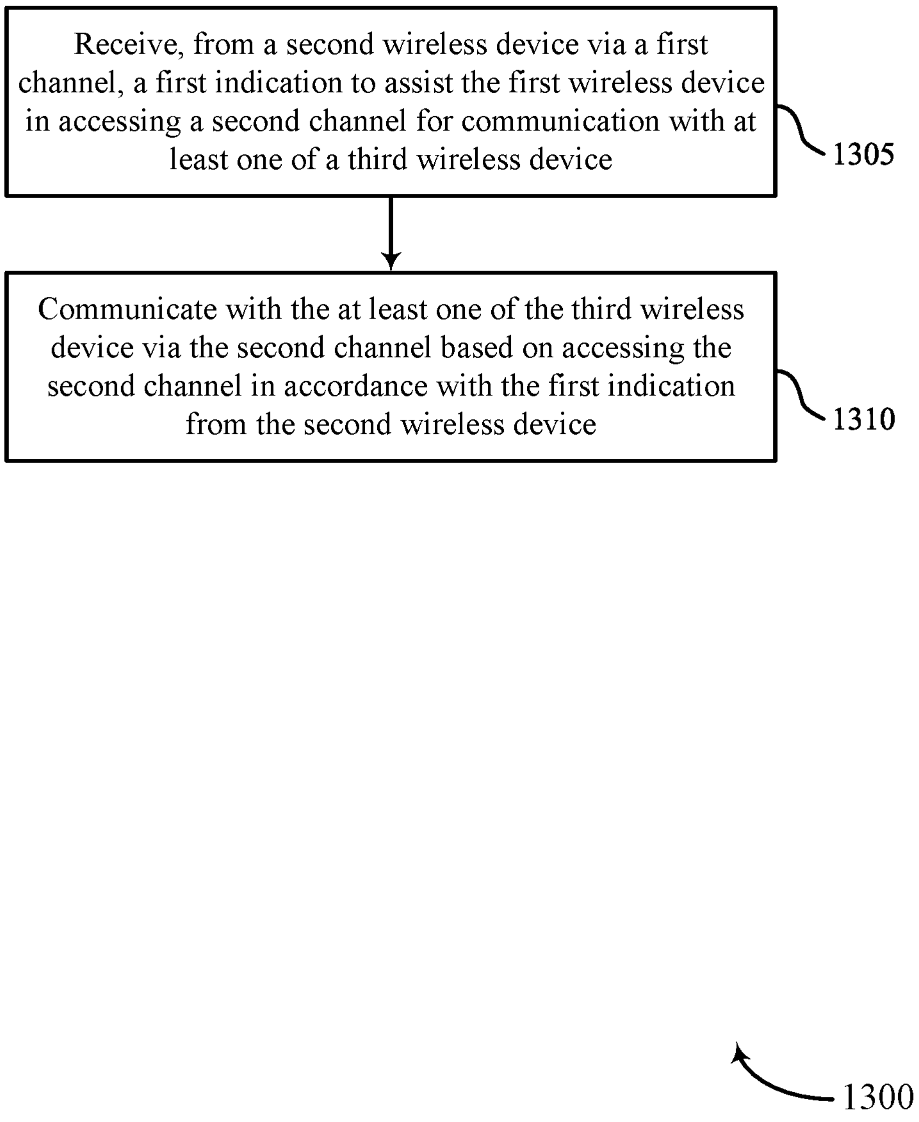
FIGS. 13 and 14 show flowcharts illustrating example processes that support techniques for multi-primary channel access according to some aspects of the present disclosure.

FIG. 13 shows a flowchart illustrating a method 1300 that supports techniques for multi-primary channel access in accordance with one or more aspects of the present disclosure. The operations of the method 1300 may be implemented by a first wireless device. In some implementations, the first wireless device may include a wireless AP (such as the AP 102-*b* shown and described with reference to FIG. 3), or a wireless STA (such as the STA 104-*d* shown and described with reference to FIG. 3), or components thereof. In some examples, an AP or a STA may execute a set of instructions to control the functional elements of the first wireless device to perform the described functions. Additionally, or alternatively, the first wireless device may perform aspects of the described functions using special-purpose hardware.

In some examples, at 1305, the first wireless device may receive, from a second wireless device via a first channel, a first indication to assist the first wireless device in accessing a second channel for communication with at least one of a third wireless device. The operations of 1305 may be performed in accordance with examples disclosed herein. In some implementations, aspects of the operations of 1305 may be performed by an assistance information component 1225, as described with reference to FIG. 12.

In some examples, at 1310, the first wireless device may communicate with the at least one of the third wireless device via the second channel based on accessing the second channel in accordance with the first indication from the second wireless device. The operations of 1310 may be performed in accordance with examples disclosed herein. In some implementations, aspects of the operations of 1310 may be performed by a channel access component 1230, as described with reference to FIG. 12.

Figure 14:
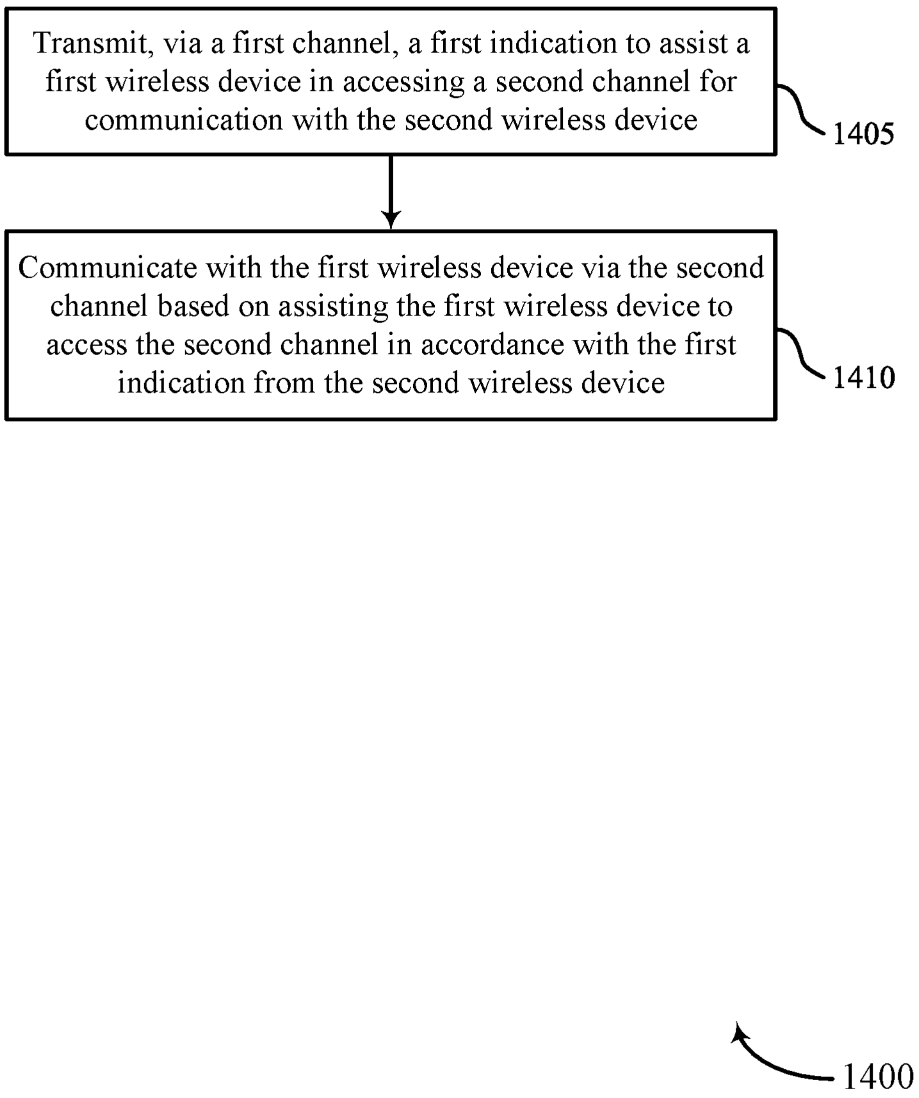

FIG. 14 shows a flowchart illustrating a method 1400 that supports techniques for multi-primary channel access in accordance with one or more aspects of the present disclosure. The operations of the method 1400 may be implemented by a second wireless device. In some implementations, the second wireless device may include a wireless AP (such as the AP 102-*a* shown and described with reference to FIG. 3), or a wireless STA (such as the STA 104-*d* shown and described with reference to FIG. 3), or components thereof. In some examples, an AP or a STA may execute a set of instructions to control the functional elements of the second wireless device to perform the described functions. Additionally, or alternatively, the second wireless device may perform aspects of the described functions using special-purpose hardware.

In some examples, at 1405, the second wireless device may transmit, via a first channel, a first indication to assist a first wireless device in accessing a second channel for communication with the second wireless device. The operations of 1405 may be performed in accordance with examples disclosed herein. In some implementations, aspects of the operations of 1405 may be performed by an assistance information component 1225, as described with reference to FIG. 12.

In some examples, at 1410, the second wireless device may communicate with the first wireless device via the second channel based on assisting the first wireless device to access the second channel in accordance with the first indication from the second wireless device. The operations of 1410 may be performed in accordance with examples disclosed herein. In some implementations, aspects of the operations of 1410 may be performed by a channel access component 1230, as described with reference to FIG. 12.

Implementation examples are described in the following numbered clauses:

Clause 1: A method for wireless communication at a first wireless device, including: receiving, from a second wireless device via a first channel, a first indication to assist the first wireless device in accessing a second channel for communication with at least one of a third wireless device; and communicating with the at least one of the third wireless device via the second channel based on accessing the second channel in accordance with the first indication from the second wireless device.

Clause 2: The method of clause 1, where the first wireless device is a first AP or a first STA that supports multi-primary channel access, eMLSR operation, or both; the second wireless device is a second AP or a second STA associated with an OBSS; one or both of the first wireless device or the second wireless device are capable of operating non-concurrently on the first channel and the second channel; and the first indication from the second wireless device is indicative of timing information that pertains to a NAV associated with a TXOP on the first channel.

Clause 3: The method of clause 2, where receiving the first indication includes: receiving, from the second wireless device via the first channel, a binary indication pertaining to whether the NAV corresponds to an actual duration of the TXOP.

Clause 4: The method of clause 3, where communicating with the at least one of the third wireless device includes: monitoring the first channel using a first radio of the first wireless device when the actual duration of the TXOP differs from a duration of the NAV; and receiving, via the second channel, one or more trigger-based uplink communications from a STA using a second radio of the first wireless device.

Clause 5: The method of any of clauses 2 through 4, where receiving the first indication includes: receiving, from the second wireless device via the first channel, the timing information that pertains to an actual duration of the TXOP, where the actual duration of the TXOP includes time durations used by all STAs participating in the TXOP.

Clause 6: The method of any of clauses 2 through 5, where the timing information is adjusted in frames transmitted by the second wireless device subsequent to transmission of the first indication.

Clause 7: The method of any of clauses 2 through 6, where an effective duration of the TXOP is increased in frames transmitted by the second wireless device subsequent to transmission of the first indication, the effective duration of the TXOP is increased as a result of a TXOP extension being granted to one or more STAs participating in the TXOP.

Clause 8: The method of any of clauses 2 through 7, where receiving the first indication includes: receiving, from the second wireless device via the first channel, the timing information that pertains to a time duration for which the second wireless device intends to use the first channel.

Clause 9: The method of any of clauses 2 through 8, where the first indication is provided in a preamble, a PHY header, a MAC header, or a MAC payload of a frame from the second wireless device.

Clause 10: The method of any of clauses 2 through 9, where receiving the first indication includes: receiving, from the second wireless device via the first channel, the timing information that identifies one or more shared APs or STAs that intend to use the first channel during the TXOP.

Clause 11: The method of clause 10, further including: performing a channel contention procedure to gain access to the first channel based on a determination that the one or more shared APs or STAs are outside a PD range of the second wireless device.

Clause 12: The method of any of clauses 10 through 11, further including: switching from the first channel to the second channel based on a determination that the one or more shared APs or STAs are within a PD range of the second wireless device.

Clause 13: The method of any of clauses 10 through 12, further including: refraining from contending for access to the first channel or the second channel based on a determination that the one or more shared APs or STAs include an AP associated with a BSS of the second wireless device.

Clause 14: The method of any of clauses 1 through 13, where the first wireless device is a first AP or a STA that supports multi-primary channel access, eMLSR operation, or both; the second wireless device is a second AP associated with an OBSS; one or both of the first wireless device or the second wireless device are capable of operating non-concurrently on the first channel and the second channel; and the first indication from the second wireless device includes bandwidth information that pertains to an R-TWT service period of the second AP associated with the OBSS.

Clause 15: The method of clause 14, where receiving the first indication includes: receiving, from the second AP via the first channel, the bandwidth information pertaining to a bandwidth the second AP intends to use during the R-TWT service period, where the bandwidth includes the first channel and excludes the second channel.

Clause 16: The method of any of clauses 14 through 15, where the bandwidth information is provided in a beacon frame or a probe response frame from the second AP.

Clause 17: The method of any of clauses 1 through 16, where the first wireless device is a STA that supports multi-primary channel access, eMLSR operation, or both; the second wireless device is an AP that supports multi-primary channel access, eMLSR operation, or both; the at least one of the third wireless device includes the AP; the first channel is the second channel; and the first indication from the second wireless device includes scheduling information that pertains to a set of STAs the AP intends to serve during a TXOP on the second channel.

Clause 18: The method of clause 17, further including: transitioning from a first power state to a second power state based on an expiration of a timeout period associated with monitoring the second channel, where the first power state includes a receive ready state that consumes more power than the second power state.

Clause 19: The method of clause 18, further including: switching from the second channel to a third channel based on transitioning from the first power state to the second power state; and remaining in the second power state until the third channel becomes available.

Clause 20: The method of any of clauses 17 through 19, where receiving the first indication includes: receiving, from the AP via the second channel, a frame identifying one or more non-AP STAs the AP intends to serve on the second channel during the TXOP.

Clause 21: The method of any of clauses 17 through 20, further including: refraining from monitoring the second channel based on a determination that the STA is absent from the set of STAs the AP intends to serve on the second channel during the TXOP.

Clause 22: The method of any of clauses 17 through 21, further including: performing an intra-BSS PPDU power saving operation while the AP is serving other STAs on the second channel during the TXOP.

Clause 23: The method of any of clauses 1 through 22, where the first wireless device is an AP that supports multi-primary channel access, eMLSR operation, or both; the second wireless device is a STA that supports multi-primary channel access, eMLSR operation, or both; the at least one of the third wireless device includes the STA; and the first indication from the second wireless device includes synchronization information to assist the AP in regaining synchronization on the first channel.

Clause 24: The method of clause 23, where receiving the first indication includes: receiving, from the STA via the first channel, a frame to assist the AP in regaining synchronization on the first channel after a TXOP on the second channel.

Clause 25: The method of any of clauses 23 through 24, where receiving the first indication includes: receiving, from the STA via the second channel, an ACK frame indicating that a second STA associated with an OBSS terminated a TXOP on the first channel, or that the AP has lost synchronization on the first channel, or both.

Clause 26: The method of clause 25, further including: performing one or more blindness recovery measures after receiving the ACK frame from the STA, where the one or more blindness recovery measures include using a lower energy detection threshold for channel contention, initiating frame exchanges with an RTS frame, or refraining from initiating subsequent frame exchanges after a failed exchange of RTS and CTS frames.

Clause 27: The method of any of clauses 23 through 26, further including: transmitting an RTS frame via the first channel to solicit a CTS frame from the STA based on a determination that the STA is synchronized on the first channel, where the CTS frame includes the first indication to assist the AP in regaining synchronization on the first channel.

Clause 28: The method of any of clauses 23 through 27, further including: performing a capability exchange with the STA, where receiving the synchronization information from the STA is based on the capability exchange.

Clause 29: The method of any of clauses 23 through 28, further including: transmitting, via the second channel, a request for the STA to assist the AP in regaining synchronization on the first channel, where receiving the first indication from the STA is based on the request.

Clause 30: The method of any of clauses 23 through 29, further including: receiving, from a STA that did not participate in a TXOP on the second channel, information to assist the AP in regaining synchronization on the second channel.

Clause 31: The method of any of clauses 1 through 30, where the first wireless device is an AP that supports multi-primary channel access, eMLSR operation, or both; the second wireless device is a STA that supports multi-primary channel access, eMLSR operation, or both; the at least one of the third wireless device includes the STA; the first channel is the second channel; and the first indication from the second wireless device transfers at least a portion of a TXOP on the second channel from the STA to the AP.

Clause 32: The method of clause 31, further including: receiving, from the STA via the second channel, a request for the AP to trigger transmission of an uplink PPDU from the STA; and transmitting, in response to the request, a trigger frame that triggers the STA to transmit the uplink PPDU via the second channel.

Clause 33: The method of any of clauses 31 through 32, further including: transmitting a beacon frame that includes a TIM bit corresponding to the STA; receiving a second frame from the STA, where the TXOP is transferred from the STA to the AP after reception of the second frame; and transmitting, via the second channel, one or more buffered PPDUs to the STA during the TXOP in accordance with the second frame.

Clause 34: The method of any of clauses 31 through 33, further including: receiving, from the STA, a request for the AP to release one or more BUs to the STA after the TXOP is transferred to the AP.

Clause 35: The method of any of clauses 31 through 34, where receiving the first indication includes: receiving, from the STA via the second channel, an RDG or a frame that transfers the TXOP to the AP.

Clause 36: A method for wireless communication at a second wireless device, including: transmitting, via a first channel, a first indication to assist a first wireless device in accessing a second channel for communication with the second wireless device; and communicating with the first wireless device via the second channel based on assisting the first wireless device to access the second channel in accordance with the first indication from the second wireless device.

Clause 37: The method of clause 36, where the first wireless device is an AP that supports multi-primary channel access, eMLSR operation, or both; the second wireless device is a STA that supports multi-primary channel access, eMLSR operation, or both; and the first indication from the second wireless device transfers at least a portion of a TXOP on the second channel from the STA to the AP.

Clause 38: The method of clause 37, further including: performing a channel contention procedure to gain access to the second channel based on detecting an OBSS PPDU on the first channel, where transmitting the first indication is based on gaining access to the second channel.

Clause 39: The method of any of clauses 37 through 38, further including: flushing a queue of the STA after gaining access to the second channel, where the TXOP is transferred to the AP after the queue is flushed.

Clause 40: The method of any of clauses 37 through 39, further including: transmitting, via the second channel, a request for the AP to release one or more BUs to the STA based on transferring the TXOP to the AP.

Clause 41: An apparatus for wireless communication at a first wireless device, including at least one processor, at least one memory coupled with the at least one processor, and instructions stored in the at least one memory and executable by the at least one processor to cause the apparatus to perform a method of any of clauses 1 through 35.

Clause 42: An apparatus for wireless communication at a first wireless device, including at least one means for performing a method of any of clauses 1 through 35.

Clause 43: A non-transitory computer-readable medium storing code for wireless communication at a first wireless device, the code including instructions executable by a processor to perform a method of any of clauses 1 through 35.

Clause 44: An apparatus for wireless communication at a second wireless device, including at least one processor, at least one memory coupled with the at least one processor, and instructions stored in the at least one memory and executable by the at least one processor to cause the apparatus to perform a method of any of clauses 36 through 40.

Clause 45: An apparatus for wireless communication at a second wireless device, including at least one means for performing a method of any of clauses 36 through 40.

Clause 46: A non-transitory computer-readable medium storing code for wireless communication at a second wireless device, the code including instructions executable by a processor to perform a method of any of clauses 36 through 40.

As used herein, the term “determine” or “determining” encompasses a wide variety of actions and, therefore, “determining" can include calculating, computing, processing, deriving, investigating, looking up (such as via looking up in a table, a database, or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system. Any functions or operations described herein as being capable of being performed by a memory may be performed by multiple memories that, individually or collectively, are capable of performing the described functions or operations. Any functions or operations described herein as being capable of being performed by a processor may be performed by multiple processors that, individually or collectively, are capable of performing the described functions or operations.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable sub-combination. As such, although features may be described above as acting in particular combinations, and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. An apparatus for wireless communication at a first wireless device, comprising:

one or more processors; and one or more memories coupled with the one or more processors, the one or more memories storing instructions executable by the one or more processors to cause the apparatus to:

receive, from a second wireless device via a first channel, a first indication to assist the first wireless device in accessing the first channel for communication based at least in part on a second channel being busy, the second channel being different from the first channel; and communicate via the first channel based at least in part on the first indication from the second wireless device.

2. The apparatus of claim 1, wherein:

the first wireless device is a first access point (AP) or a first station (STA) that supports multi-primary channel access, enhanced multi-link single-radio operation, or both;

the second wireless device is a second AP or a second STA associated with an overlapping basic service set (OBSS); and one or both of the first wireless device or the second wireless device are capable of operating non-concurrently on the first channel and the second channel, wherein the instructions are further executable by the one or more processors to cause the apparatus to:

receive a second indication from the second wireless device indicative of timing information that pertains to a network allocation vector (NAV) associated with a transmit opportunity (TXOP) on the second channel.

3. The apparatus of claim 2, wherein, to receive the second indication, the instructions are executable by the one or more processors to cause the apparatus to:

receive, from the second wireless device via the second channel, a binary indication pertaining to whether the NAV corresponds to an actual duration of the TXOP.

4. The apparatus of claim 3, wherein the instructions to communicate are executable by the one or more processors to cause the apparatus to:

monitor the second channel using a first radio of the first wireless device when the actual duration of the TXOP differs from a duration of the NAV; and receive, via the first channel, one or more trigger-based uplink communications from a STA using a second radio of the first wireless device.

5. The apparatus of claim 2, wherein the instructions to receive the second indication are executable by the one or more processors to cause the apparatus to:

receive, from the second wireless device via the second channel, the timing information that pertains to an actual duration of the TXOP, wherein the actual duration of the TXOP includes time durations used by all STAs participating in the TXOP.

6. The apparatus of claim 2, wherein:

an effective duration of the TXOP is increased in frames transmitted by the second wireless device subsequent to transmission of the second indication; and the effective duration of the TXOP is increased as a result of a TXOP extension being granted to one or more STAs participating in the TXOP.

7. The apparatus of claim 2, wherein the instructions to receive the second indication are executable by the one or more processors to cause the apparatus to:

receive, from the second wireless device via the second channel, the timing information that pertains to a time duration for which the second wireless device intends to use the second channel.

8. The apparatus of claim 2, wherein the instructions to receive the second indication are executable by the one or more processors to cause the apparatus to:

receive, from the second wireless device via the second channel, the timing information that identifies one or more shared APs or STAs that intend to use the second channel during the TXOP.

9. The apparatus of claim 8, wherein the instructions are further executable by the one or more processors to cause the apparatus to:

perform a channel contention procedure to gain access to the second channel based at least in part on a determination that the one or more shared APs or STAs are outside a preamble detection (PD) range of the second wireless device.

10. The apparatus of claim 8, wherein the instructions are further executable by the one or more processors to cause the apparatus to:

switch from the second channel to the first channel based at least in part on a determination that the one or more shared APs or STAs are within a preamble detection (PD) range of the second wireless device.

11. The apparatus of claim 1, wherein:

the first wireless device is a first access point (AP) or a station (STA) that supports multi-primary channel access, enhanced multi-link single-radio operation, or both;

the second wireless device is a second AP associated with an overlapping basic service set (OBSS);

one or both of the first wireless device or the second wireless device are capable of operating non-concurrently on the first channel and the second channel, wherein the instructions are further executable by the one or more processors to cause the apparatus to:

receive a second indication from the second wireless device comprising bandwidth information that pertains to a restricted target wake time (R-TWT) service period of the second AP associated with the OBSS.

12. The apparatus of claim 11, wherein the instructions to receive the second indication are executable by the one or more processors to cause the apparatus to:

receive, from the second AP via the second channel, the bandwidth information pertaining to a bandwidth the second AP intends to use during the R-TWT service period, wherein the bandwidth includes the second channel and excludes the first channel.

13. The apparatus of claim 1, wherein:

the first wireless device is a station (STA) that supports multi-primary channel access, enhanced multi-link single-radio operation, or both;

the second wireless device is an access point (AP) that supports multi-primary channel access, enhanced multi-link single-radio operation, or both; and the first indication from the second wireless device comprises scheduling information that pertains to a set of stations (STAs) the AP intends to serve during a transmit opportunity (TXOP) on the first channel.

14. The apparatus of claim 13, wherein the instructions are further executable by the one or more processors to cause the apparatus to:

transition from a first power state to a second power state based at least in part on an expiration of a timeout period associated with monitoring the first channel, wherein the first power state comprises a receive ready state that consumes more power than the second power state.

15. The apparatus of claim 14, wherein the instructions are further executable by the one or more processors to cause the apparatus to:

switch from the first channel to a third channel based at least in part on transitioning from the first power state to the second power state; and remain in the second power state until the third channel becomes available.

16. The apparatus of claim 13, wherein the instructions to receive the first indication are executable by the one or more processors to cause the apparatus to:

receive, from the AP via the first channel, a frame identifying one or more non-AP STAs the AP intends to serve on the second channel during the TXOP.

17. The apparatus of claim 1, wherein:

the first wireless device is an access point (AP) that supports multi-primary channel access, enhanced multi-link single-radio operation, or both;

the second wireless device is a station (STA) that supports multi-primary channel access, enhanced multi-link single-radio operation, or both, wherein the instructions are further executable by the one or more processors to cause the apparatus to:

receive a second indication from the second wireless device comprising synchronization information to assist the AP in regaining synchronization on the first channel.

18. The apparatus of claim 17, wherein the instructions to receive the second indication are executable by the one or more processors to cause the apparatus to:

receive, from the STA via the first channel, an acknowledgement (ACK) frame indicating that a second STA associated with an overlapping basic service set (OBSS) terminated a transmit opportunity (TXOP) on the second channel, or that the AP has lost synchronization on the second channel, or both.

19. The apparatus of claim 18, wherein the instructions are further executable by the one or more processors to cause the apparatus to:

perform one or more blindness recovery measures after receiving the ACK frame from the STA, wherein the one or more blindness recovery measures include using a lower energy detection threshold for channel contention, initiating frame exchanges with a request to send (RTS) frame, or refraining from initiating subsequent frame exchanges after a failed exchange of RTS and clear to send (CTS) frames.

20. The apparatus of claim 17, wherein the instructions are further executable by the one or more processors to cause the apparatus to:

transmit a request to send (RTS) frame via the second channel to solicit a clear to send (CTS) frame from the STA based at least in part on a determination that the STA is synchronized on the second channel, wherein the CTS frame comprises the second indication to assist the AP in regaining synchronization on the second channel.

21. The apparatus of claim 17, wherein the instructions are further executable by the one or more processors to cause the apparatus to:

transmit, via the first channel, a request for the STA to assist the AP in regaining synchronization on the second channel, wherein receiving the second indication from the STA is based at least in part on the request.

22. The apparatus of claim 1, wherein:

the first wireless device is an access point (AP) that supports multi-primary channel access, enhanced multi-link single-radio operation, or both;

the second wireless device is a station (STA) that supports multi-primary channel access, enhanced multi-link single-radio operation, or both; and the first indication from the second wireless device transfers at least a portion of a transmit opportunity (TXOP) on the first channel from the STA to the AP.

23. The apparatus of claim 22, wherein the instructions are further executable by the one or more processors to cause the apparatus to:

receive, from the STA via the first channel, a request for the AP to trigger transmission of an uplink physical layer protocol data unit (PPDU) from the STA; and transmit, in response to the request, a trigger frame that triggers the STA to transmit the uplink PPDU via the first channel.

24. The apparatus of claim 22, wherein the instructions are further executable by the one or more processors to cause the apparatus to:

transmit a beacon frame that includes a traffic indication map (TIM) bit corresponding to the STA;

receive a second frame from the STA, wherein the TXOP is transferred from the STA to the AP after reception of the second frame; and transmit, via the first channel, one or more buffered physical layer protocol data units (PPDUs) to the STA during the TXOP in accordance with the second frame.

25. The apparatus of claim 22, wherein the instructions are further executable by the one or more processors to cause the apparatus to:

receive, from the STA, a request for the AP to release one or more bufferable units (BUs) to the STA after the TXOP is transferred to the AP.

26. An apparatus for wireless communication at a second wireless device, comprising:

one or more processors; and one or more memories coupled with the one or more processors, the one or more memories storing instructions executable by the one or more processors to cause the apparatus to:

transmit, via a first channel, a first indication to assist a first wireless device in accessing the first channel for communication with the second wireless device based at least in part on a second channel being busy, the second channel being different from the first channel; and communicate with the first wireless device via the first channel based at least in part on assisting the first wireless device to access the first channel in accordance with the first indication from the second wireless device.

27. The apparatus of claim 26, wherein:

the first wireless device is an access point (AP) that supports multi-primary channel access, enhanced multi-link single-radio operation, or both;

the second wireless device is a station (STA) that supports multi-primary channel access, enhanced multi-link single-radio operation, or both; and the first indication from the second wireless device transfers at least a portion of a transmit opportunity (TXOP) on the first channel from the STA to the AP.

28. The apparatus of claim 27, wherein the instructions are further executable by the one or more processors to cause the apparatus to:

perform a channel contention procedure to gain access to the first channel based at least in part on detecting an overlapping basic service set (OBSS) physical layer protocol data unit (PPDU) on the second channel, wherein transmitting the first indication is based at least in part on gaining access to the first channel.

29. A method for wireless communication at a first wireless device, comprising:

receiving, from a second wireless device via a first channel, a first indication to assist the first wireless device in accessing the first channel for communication based at least in part on a second channel being busy, the second channel being different from the first channel; and communicating via the first channel based at least in part on the first indication from the second wireless device.

30. A method for wireless communication at a second wireless device, comprising:

transmitting, via a first channel, a first indication to assist a first wireless device in accessing the first channel for communication with the second wireless device based at least in part on a second channel being busy, the second channel being different from the first channel; and communicating with the first wireless device via the first channel based at least in part on assisting the first wireless device to access the first channel in accordance with the first indication from the second wireless device.

* * * * *